US 12,298,803 B2

(12) United States Patent
Park et al.

(10) Patent No.: US 12,298,803 B2
(45) Date of Patent: *May 13, 2025

(54) KICKSTAND FOR OPENING FOLDABLE COMPUTING DEVICE

(71) Applicant: Microsoft Technology Licensing, LLC, Redmond, WA (US)

(72) Inventors: Daniel Clark Park, Woodinville, WA (US); Michael Gordon Oldani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/186,031

(22) Filed: Mar. 17, 2023

(65) Prior Publication Data

US 2024/0201734 A1 Jun. 20, 2024

Related U.S. Application Data

(63) Continuation-in-part of application No. 18/069,180, filed on Dec. 20, 2022, now Pat. No. 12,072,740.

(51) Int. Cl.
*G06F 1/16* (2006.01)
*A45C 11/00* (2006.01)
(Continued)

(52) U.S. Cl.
CPC ............ *G06F 1/1607* (2013.01); *A45C 11/00* (2013.01); *F16M 11/2021* (2013.01);
(Continued)

(58) Field of Classification Search
CPC ................. G06F 1/1607; G06F 1/1616; G06F 2200/1633; G06F 1/1632; G06F 1/1647;
(Continued)

(56) References Cited

U.S. PATENT DOCUMENTS 10,606,314 B1 3/2020 Takano
2011/0031287 A1 2/2011 Le Gette et al.
(Continued)

FOREIGN PATENT DOCUMENTS

CN 215734398 U 2/2022
CN 217445401 U 9/2022
(Continued)

OTHER PUBLICATIONS

Notice of Allowance mailed on Apr. 22, 2024, in U.S. Appl. No. 18/069,180, 09 pages.
(Continued)

*Primary Examiner* — Amy J. Sterling
(74) *Attorney, Agent, or Firm* — Alleman Hall & Tuttle LLP

(57) ABSTRACT

Examples of kickstand assemblies for foldable computing devices are provided. In one example, in a foldable computing device comprising a first frame rotatably coupled to a second frame, a method of using a kickstand assembly to release the first frame and the second frame from a closed orientation comprises sliding an upper kickstand plate of the kickstand assembly in a lateral direction relative to the first frame. The method includes, at least on condition of sliding the upper kickstand plate in the lateral direction, biasing the first frame and the second frame to rotate open from the closed orientation.

10 Claims, 24 Drawing Sheets

(51) Int. Cl.
*F16M 11/20* (2006.01)
*F16M 13/00* (2006.01)
(52) U.S. Cl.
CPC ...... *F16M 11/2085* (2013.01); *F16M 13/005* (2013.01); *G06F 1/1616* (2013.01); *A45C 2011/002* (2013.01); *A45C 2011/003* (2013.01); *A45C 2200/15* (2013.01)
(58) Field of Classification Search
CPC ....... G06F 1/166; G06F 1/1626; A45C 11/00; A45C 2011/002; A45C 2011/003; A45C 2200/15; F16M 11/2021; F16M 11/2085; F16M 13/005; F16M 11/38
See application file for complete search history.

(56) References Cited

U.S. PATENT DOCUMENTS

| | | | |
|---|---|---|---|
| 2018/0052498 A1 | 2/2018 | Nakagaki | |
| 2019/0107245 A1 | 4/2019 | Torres | |
| 2019/0278324 A1* | 9/2019 | Yoon | G06F 1/1616 |
| 2019/0335258 A1 | 10/2019 | Vaturi | |
| 2021/0112673 A1 | 4/2021 | Justin | |
| 2021/0311523 A1* | 10/2021 | Bai | H05K 5/0226 |
| 2022/0197352 A1 | 6/2022 | Nishi | |
| 2022/0413550 A1 | 12/2022 | Huang | |
| 2023/0044946 A1* | 2/2023 | Watamura | G06F 1/1626 |
| 2023/0119798 A1* | 4/2023 | Atom | G06F 1/1626 361/679.09 |
| 2023/0195176 A1* | 6/2023 | Perelli | G06F 1/166 361/679.01 |
| 2024/0004426 A1 | 1/2024 | Yamada | |
| 2024/0201747 A1 | 6/2024 | Gordon et al. | |

FOREIGN PATENT DOCUMENTS

| | | | |
|---|---|---|---|
| CN | 115552353 | A | 12/2022 |
| JP | 2020198605 | A | 12/2020 |
| KR | 20210094923 | A | 7/2021 |
| WO | 2021171017 | A1 | 9/2021 |

OTHER PUBLICATIONS

"DailyObjects Finger Grip/Mobile Stand for Smartphones—Red Skate Slider Phone Holder", Retrieved From: https://www.amazon.in/DailyObjects-Finger-Mobile-Stand-Smartphones/dp/B09P86SPVH, Nov. 10, 2022, 5 Pages.

"Galaxy Z Fold4 Camera Protection Camshield Pro Case", Retrieved From: https://www.shopbasic.in/products/galaxy-z-fold4-camera-protection-camshield-pro-case, Nov. 10, 2022, 8 Pages.

"Galaxy Z Fold4 Luxury Colored Strap Glass Flip Case", Retrieved From: https://icasecart.com/products/galaxy-z-fold4-luxury-colored-strap-glass-flip-case, Nov. 10, 2022, pp. 1-8.

"Samsung Galaxy Z Fold4 GKK Integrated Magnetic Armor Flip Phone Case With Pen Box(Grey)", Retrieved From: https://in.buy2fix.store/products/for-samsung-galaxy-z-fold4-gkk-integrated-magnetic-armor-flip-phone-case-with-pen-boxgrey, Nov. 10, 2022, 13 Pages.

"Tizum Z117—Universal Foldable Handheld Mobile Holder Kickstand, Horizontal or Vertical Phone Stand Hand, Finger Grip, Magnetic Suction Folding Bracket Leather Finish (Set of 3)", Jan. 24, 2023, Retrieved From: https://www.amazon.in/Universal-Foldable-Handheld-Kickstand-Horizontal/dp/B09RQTF9TN/ref=pd_lpo_2?pd_rd_w=MgNkL&content-id=amznl.sym.66c58da2-d957-4807-8106-b37631bfb8ca&pf_rd_p=66c58da2-d957-4807-8106-b37631bfb8ca&pf_rd_r=CY1NF1CHPVZPPGRHVTW3&pd_rd_wg=QNS9v&pd_rd_r=20499deb-6d61-4a45-949d-f64a9d62a257&pd_rd_i=B09RQTF9TN&psc=1.

International Search Report and Written Opinion received for PCT Application No. PCT/US2023/035757 mailed on Jan. 26, 2024, 13 pages.

International Search Report and Written Opinion received for PCT Application No. PCT/US2023/036323 mailed on Jan. 26, 2024, 14 pages.

\* cited by examiner

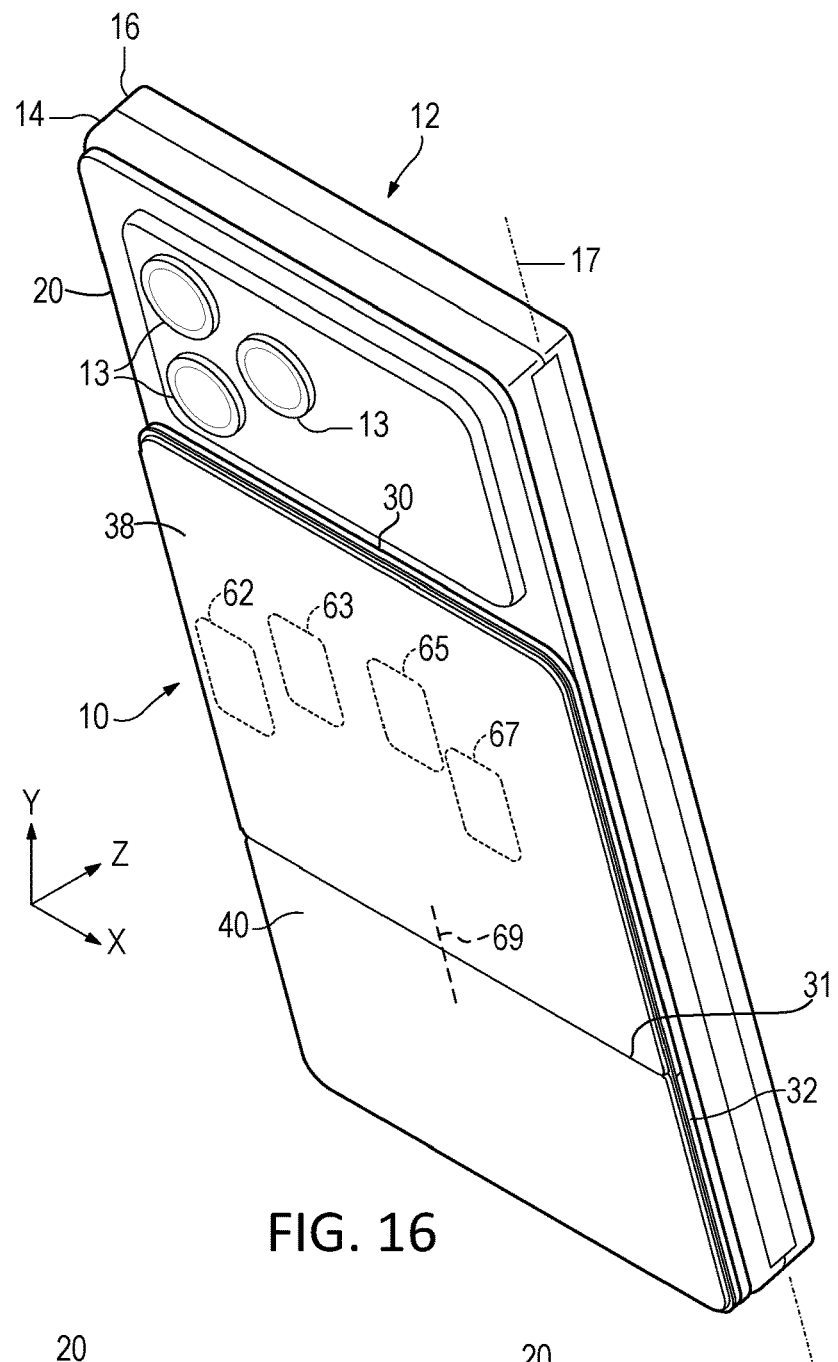
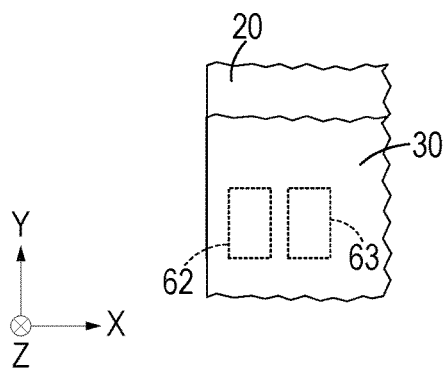
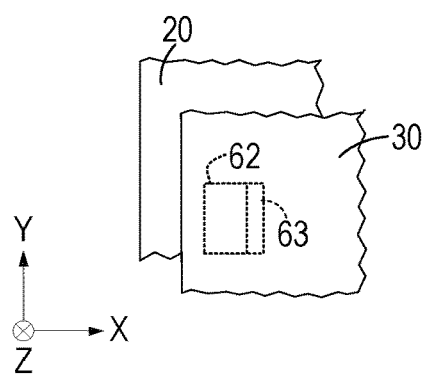
FIG. 16
FIG. 17
FIG. 18

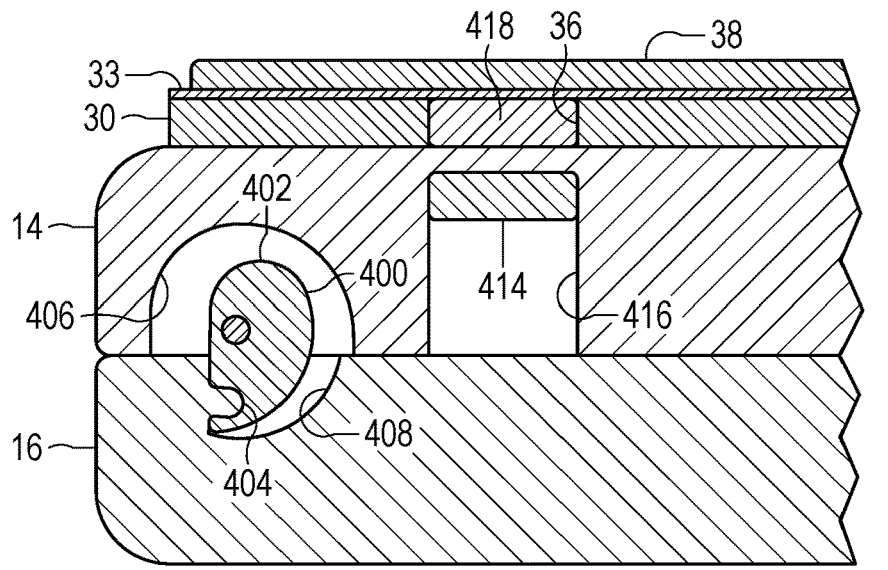
FIG. 32
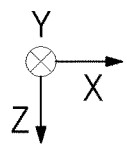
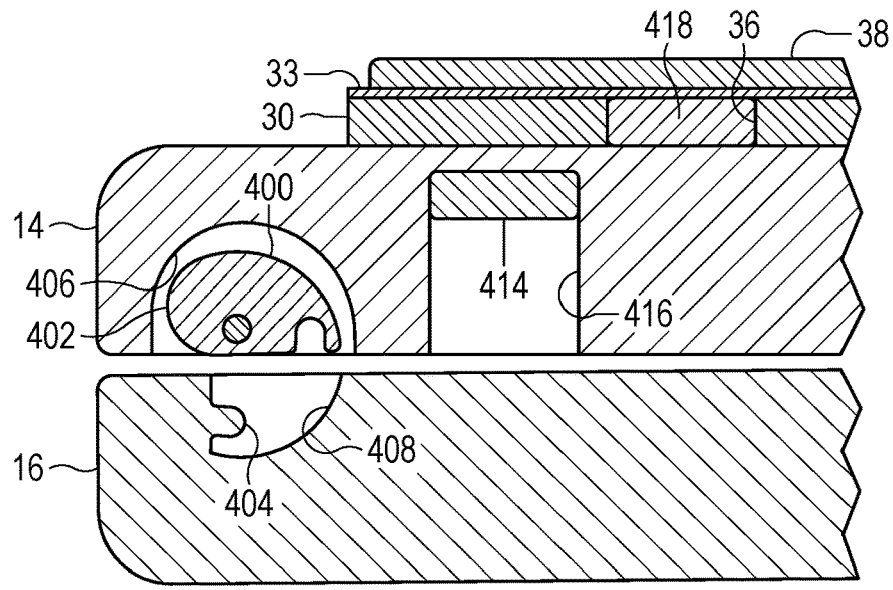
FIG. 33
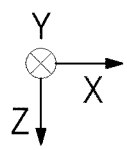
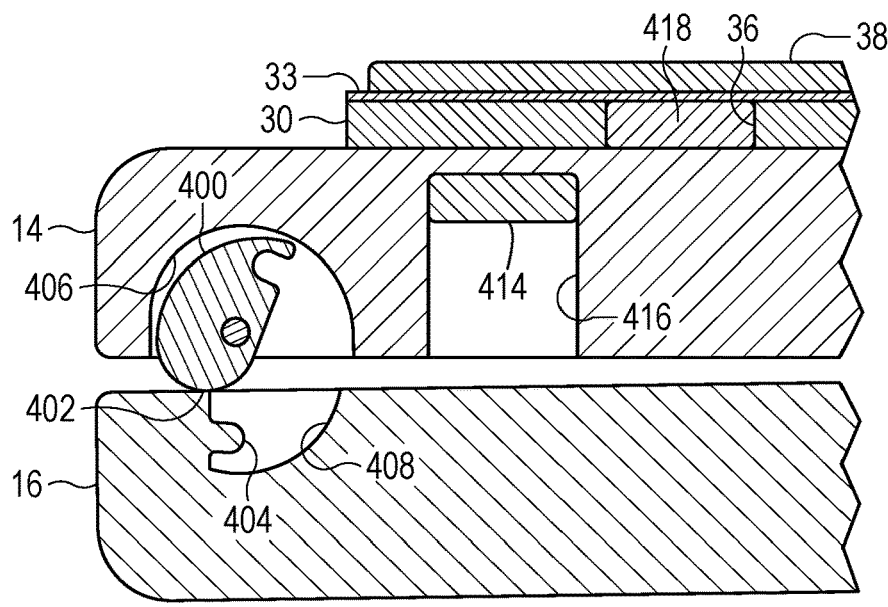
FIG. 34
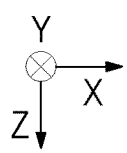

500 ⟶

```
┌─────────────────────────────────────────────────────────────────┐
│ Sliding an upper kickstand plate of the kickstand assembly in a │
│ lateral direction relative to the first frame 502               │
└─────────────────────────────────────────────────────────────────┘
                                │
                                ▼
┌─────────────────────────────────────────────────────────────────┐
│ At least on condition of sliding the upper kickstand plate in   │
│ the lateral direction, biasing the first frame and the second   │
│ frame to rotate open from the closed orientation 504            │
└─────────────────────────────────────────────────────────────────┘
                                │
                                ▼
┌─────────────────────────────────────────────────────────────────┐
│ Wherein the first frame is rotatably coupled to the second      │
│ frame at a frame hinge, and biasing the first frame and the     │
│ second frame to rotate open from the closed orientation         │
│ comprises biasing the first frame away from the second frame    │
│ using a spring at the frame hinge 508                           │
└─────────────────────────────────────────────────────────────────┘
                                │
                                ▼
┌─────────────────────────────────────────────────────────────────┐
│ Wherein biasing the first frame and the second frame to rotate  │
│ open from the closed orientation comprises biasing the first    │
│ frame away from the second frame using a device opening magnet  │
│ in the kickstand assembly that repels a frame opening magnet    │
│ in the second frame 512                                         │
└─────────────────────────────────────────────────────────────────┘
                                │
                                ▼
┌─────────────────────────────────────────────────────────────────┐
│ Retaining the first frame and the second frame in an open       │
│ orientation by attracting a plate holding magnet in the upper   │
│ kickstand plate to a frame holding magnet in the second frame   │
│ 516                                                             │
└─────────────────────────────────────────────────────────────────┘
                                │
                                ▼
┌─────────────────────────────────────────────────────────────────┐
│ Wherein biasing the first frame and the second frame to rotate  │
│ open from the closed orientation comprises translating a        │
│ plunger slidably received in the first frame into contact with  │
│ the second frame 520                                            │
└─────────────────────────────────────────────────────────────────┘
                                │
                                ▼
┌─────────────────────────────────────────────────────────────────┐
│ Wherein biasing the first frame and the second frame to rotate  │
│ open from the closed orientation comprises triggering a sensor  │
│ in the first frame to cause a motor in the first frame to open  │
│ a moveable latch in the first frame and cause a latch           │
│ contacting surface of the moveable latch to contact the second  │
│ frame to bias the first frame and the second frame to rotate    │
│ open from the closed orientation 524                            │
└─────────────────────────────────────────────────────────────────┘
```

FIG. 36

KICKSTAND FOR OPENING FOLDABLE COMPUTING DEVICE

CROSS REFERENCE TO RELATED APPLICATIONS

This application is a continuation-in-part of U.S. application Ser. No. 18/069,180, filed Dec. 20, 2022, the entire disclosure of which is hereby incorporated herein by reference for all purposes.

BACKGROUND

Foldable computing devices can be utilized in a variety of positions and orientations for different use cases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed and further described below that relate kickstand assemblies for foldable computing devices. In one example, a kickstand assembly is disclosed for a foldable computing device that comprises a first frame rotatably coupled to a second frame, with the second frame comprising a frame opening magnet. The kickstand assembly comprises a backplate comprising a backplate deploy magnet, an upper kickstand plate slidably connected to the backplate, and a lower kickstand plate rotatably coupled to the upper kickstand plate.

The lower kickstand plate comprises a closing magnet that attracts the backplate deploy magnet, and a kickstand opening magnet laterally spaced from the closing magnet. When the upper kickstand plate is laterally translated relative to the backplate, the kickstand opening magnet repels the backplate deploy magnet to cause the lower kickstand plate to rotate about the upper kickstand plate. Additionally, when the upper kickstand plate is laterally translated relative to the backplate, a device opening magnet that repels the frame opening magnet in the second frame to bias the first frame and the second frame to rotate open from a closed orientation.

In another example, a kickstand assembly is disclosed for a foldable computing device that comprises a first frame rotatably coupled to a second frame, with the second frame comprising a frame holding magnet. The kickstand assembly comprises a backplate comprising a backplate deploy magnet, and an upper kickstand plate slidably connected to the backplate, the upper kickstand plate comprising a plate holding magnet.

A lower kickstand plate is rotatably coupled to the upper kickstand plate. The lower kickstand plate comprises a closing magnet that attracts the backplate deploy magnet, and a kickstand opening magnet laterally spaced from the closing magnet. When the upper kickstand plate is laterally translated relative to the backplate, the kickstand opening magnet repels the backplate deploy magnet to cause the lower kickstand plate to rotate about the upper kickstand plate. Additionally, when the first frame and the second frame are in an open orientation, the plate holding magnet attracts the frame holding magnet to retain the first frame and the second frame in the open orientation.

In another example, a kickstand assembly is disclosed for a foldable computing device that comprises a first frame rotatably coupled to a second frame. The first frame comprises a backplate deploy magnet and defines a plunger aperture that slidably receives a plunger, with the plunger comprising a first ramped surface and an opposing contacting surface. An upper kickstand plate is slidably connected to the first frame and comprises a second ramped surface that contacts the first ramped surface of the plunger when the upper kickstand plate is in a home position.

A lower kickstand plate is rotatably coupled to the upper kickstand plate. The lower kickstand plate comprises a closing magnet that attracts the backplate deploy magnet, and a kickstand opening magnet laterally spaced from the closing magnet. When the upper kickstand plate is laterally translated relative to the backplate, the kickstand opening magnet repels the backplate deploy magnet to cause the lower kickstand plate to rotate about the upper kickstand plate. Additionally, when the upper kickstand plate is laterally translated from the home position, the second ramped surface of the upper kickstand plate slides along the first ramped surface of the plunger to translate the plunger into contact with the second frame and bias the first frame and the second frame to rotate open from a closed orientation.

In another example, a kickstand assembly is disclosed for a foldable computing device that comprises a first frame rotatably coupled to a second frame. The first frame comprises a backplate deploy magnet and defines a plunger aperture that slidably receives a plunger, with the plunger comprising a first ramped surface and an opposing contacting surface. An upper kickstand plate is slidably connected to the first frame and comprises a second ramped surface that contacts the first ramped surface of the plunger when the upper kickstand plate is in a home position.

A lower kickstand plate is rotatably coupled to the upper kickstand plate. The lower kickstand plate comprises a closing magnet that attracts the backplate deploy magnet, and a kickstand opening magnet laterally spaced from the closing magnet. When the upper kickstand plate is laterally translated relative to the backplate, the kickstand opening magnet repels the backplate deploy magnet to cause the lower kickstand plate to rotate about the upper kickstand plate. Additionally, when the upper kickstand plate is laterally translated from the home position, the second ramped surface of the upper kickstand plate slides along the first ramped surface of the plunger to translate the plunger into contact with the second frame and bias the first frame and the second frame to rotate open from a closed orientation.

In another example, in a foldable computing device comprising a first frame rotatably coupled to a second frame, a method of using a kickstand assembly to release the first frame and the second frame from a closed orientation is provided. The method comprises sliding an upper kickstand plate of the kickstand assembly in a lateral direction relative to the first frame and, at least on condition of sliding the upper kickstand plate in the lateral direction, biasing the first frame and the second frame to rotate open from the closed orientation.

BRIEF DESCRIPTION OF THE DRAWINGS

FIG. 16 shows another example of a kickstand assembly utilizing magnets to bias the first frame and the second frame to rotate open according to examples of the present disclosure.

FIG. 17 shows a partial view of the upper kickstand plate and opening magnets of the kickstand assembly of FIG. 16.

FIG. 18 shows the upper kickstand plate translated in the x-axis direction.

FIG. 32 is a cross-sectional view taken along line 32 in FIG. 31.

FIG. 33 shows the upper kickstand plate translated in the x-axis direction to move the trigger magnet away from the sensor and cause the motor to open the moveable latch.

FIG. 34 shows a latch contacting surface of the moveable latch contacting the second frame to bias the first frame and the second frame to rotate open from the closed orientation.

FIG. 36 shows a flow diagram of a method of using a kickstand assembly to release the first frame and the second frame from a closed orientation according to examples of the present disclosure.

DETAILED DESCRIPTION

Figure 1:
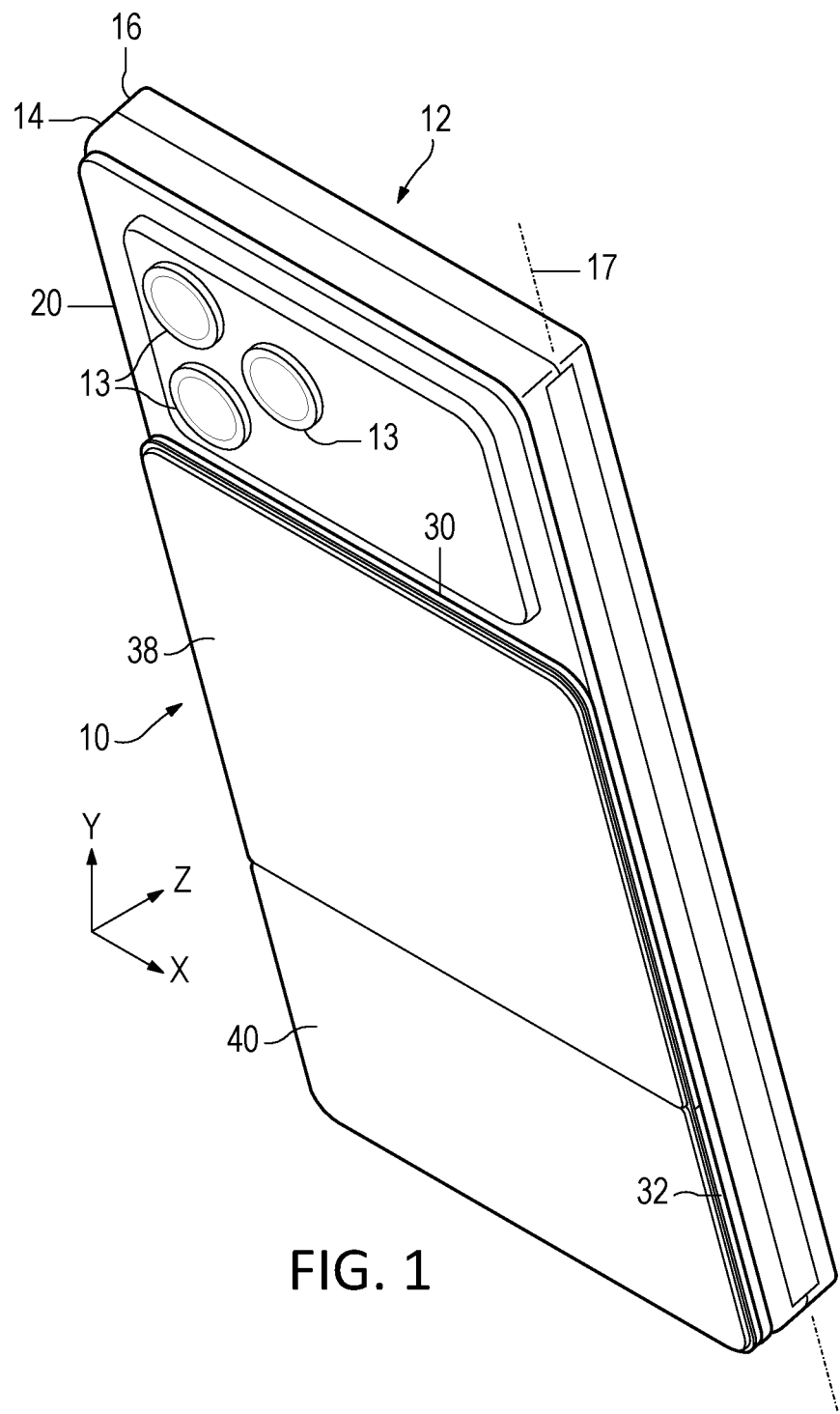
FIG. 1 shows one example of a kickstand assembly mounted to a foldable computing device according to examples of the present disclosure.

Some foldable computing devices include two frames or other structures that are rotatably coupled at a hinge. Some of these devices utilize a flexible display that can deform as display support frames beneath the flexible display are folded. In some of these devices, hinges couple two display supports for folding 180 degrees from an end-to-end (or open) orientation in which the flexible display is substantially planar to a face-to-face (or closed) orientation in which one portion of the flexible display is facing the opposing portion. In other examples the two display supports can fold substantially 360 degrees from a back-to-back orientation in which the flexible display wraps around the folded supports to the face-to-face orientation.

In other foldable computing devices, two frames each support separate displays that can be folded between open and closed orientations. Other foldable devices can have a single display affixed or integral to one of the frames. In any of these devices, one or more other components can be attached to or integral with the frames, such as a touchpad, button(s), camera(s), keyboard, etc.

As noted above, foldable computing devices can be utilized by an end user in a variety of positions and orientations for different use cases. In some examples, a user can desire to use a foldable computing device in an unfolded or end-to-end configuration with the device positioned on a surface at a raised angle to the surface. For example, a user may desire to read a book or scroll through messages while resting the device on a table at an angle. In other examples, a user can desire to utilize a foldable computing device in a folded configuration with the device similarly positioned on a surface at an angle, such as for taking a selfie or video.

Some devices include a slidable kickstand that provides an integrated stand for supporting the device on a surface in the folded and/or unfolded configuration. In some of these examples, sliding an upper portion of the kickstand to a deployed position automatically deploys a lower portion.

Some foldable computing devices utilize a mechanism or other retention means for retaining the device in the closed/folded configuration. To open the device from the closed configuration, a user is required to manually disengage a separate mechanism or exert a sufficient separating force on the two frames to overcome the retention force. These configurations can present accessibility issues, such as for users with atypical fine motor skills and/or hand and finger strength.

Accordingly, the present disclosure describes kickstand assemblies for a foldable computing device that address one or more of the above considerations. In some examples and as described in more detail below, kickstand assemblies of the present disclosure are configured to release the first frame and the second frame from a closed orientation when the kickstand assembly is shifted laterally with respect to the two frames. Advantageously and in this manner, kickstand assemblies of the present disclosure enable a user to easily open the device from the closed orientation while deploying the kickstand. Additionally and in some examples, when the two frames have transitioned to the open configuration, magnets releasably secure the first frame and the second frame in the open configuration, thereby stabilizing the two frames in this position.

FIGS. 1-8 show one example of a kickstand assembly 10 according to aspects of the present disclosure. In the present example and as described in more detail below, the kickstand assembly 10 is removably attached to a foldable computing device 12 that includes a first frame 14 rotatably coupled to a second frame 16 via a device hinge (not shown) along a device folding axis 17. The foldable computing device 12 includes a flexible display (not shown) that is supported by the first frame 14 and the second frame 16 on the opposing sides of these frames as viewed in FIGS. 1 and 2. The first frame 14 and the second frame 16 may be rotated between an end-to-end (open) orientation (see FIG. 2) and a face-to-face (closed) orientation (see FIG. 1) in which the flexible display is folded in the interior of the device.

It will be appreciated that the foldable computing device 12 is merely one example of a wide variety of foldable devices with which kickstand assemblies of the present disclosure may be utilized. In other examples, kickstand assemblies of the present disclosure can be utilized with numerous other foldable computing devices having different form factors, capabilities, components, and/or other features. Examples include but are not limited to smart phones, hand-held computing devices, tablets, laptops, and wearable computing devices.

Figure 2:
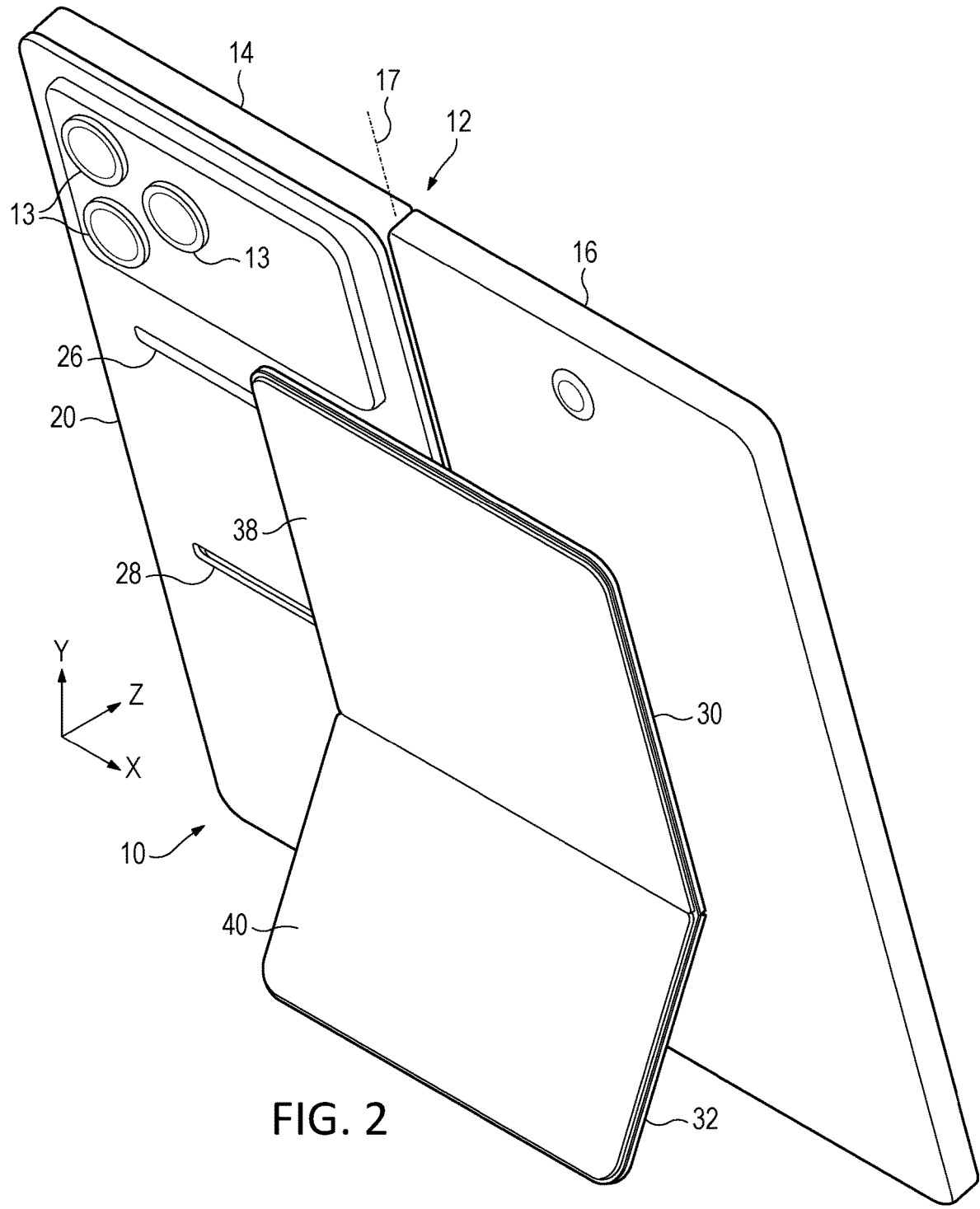
FIG. 2 shows the kickstand assembly in a deployed position.
Figure 3:
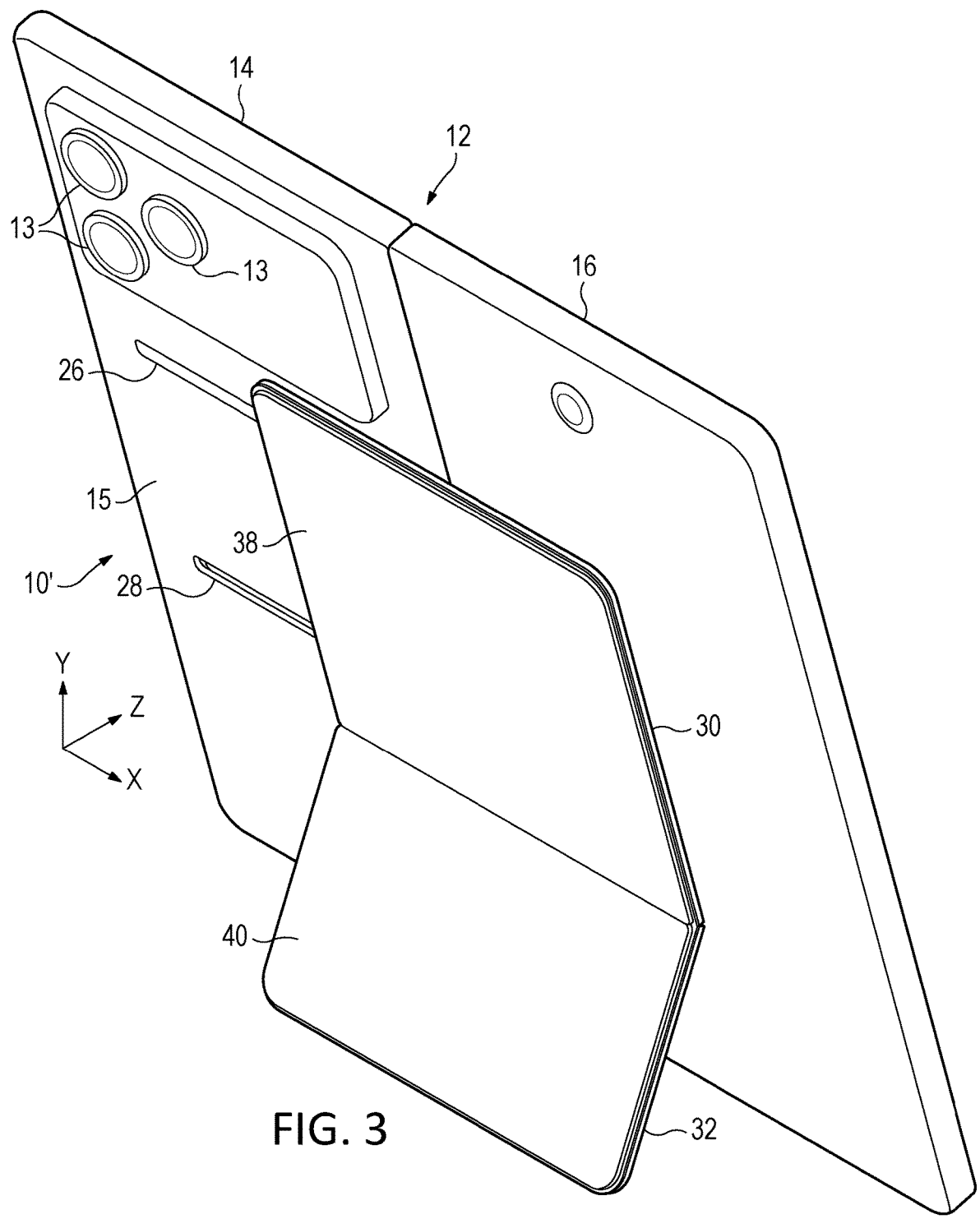
FIG. 3 shows another example of a kickstand assembly integrated into one of the frames of the foldable computing device according to examples of the present disclosure.
Figure 8:
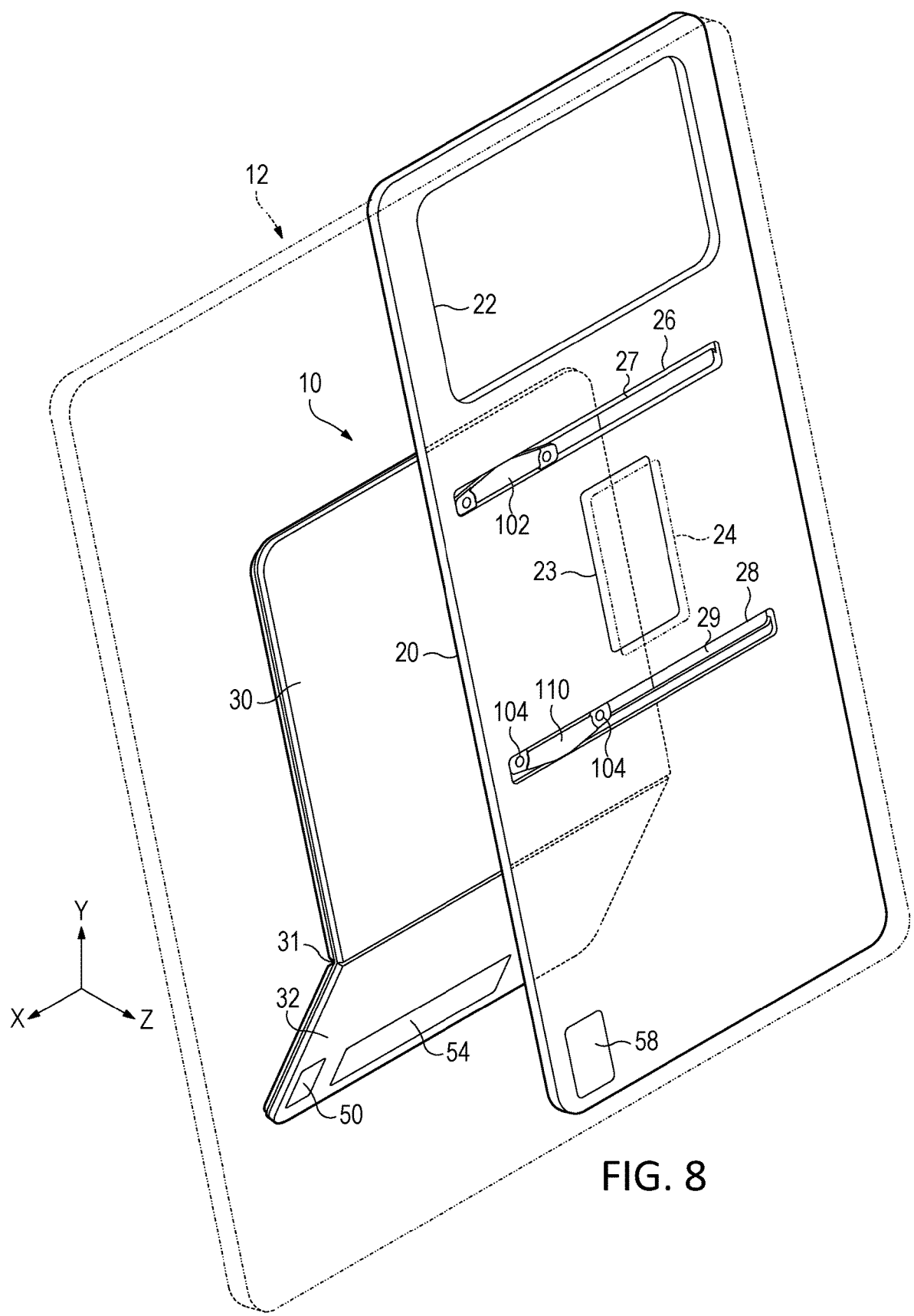
FIG. 8 shows another view of the kickstand assembly in a deployed position.

In the present example and with reference to FIGS. 1, 2, and 8, the kickstand assembly 10 comprises a backplate 20 that includes a window 22. In this example, when the backplate 20 is installed onto the rear face 15 of the first frame 14 as shown in FIGS. 1 and 2, a plurality of camera lenses 13 protruding from the rear face of the first frame 14 are located within the window 22. In this example, and in one potential advantage of the present disclosure, the backplate 20 is a separate structure that is removably attached to the foldable computing device 12. More particularly, in this example and with reference to FIGS. 4 and 8, the backplate comprises a backplate accessory magnet 23 that is configured to attract a corresponding frame accessory magnet 24 located in the first frame 14 of the foldable computing device 12. Advantageously, this configuration allows a user to conveniently and easily attach or detach the kickstand assembly 10 from the foldable computing device 12.

In other examples, the backplate accessory magnet 23 can be positioned in a variety of other locations in the backplate 20 to correspond with a location of a corresponding frame accessory magnet 24 in the first frame of the foldable computing device. Additionally or alternatively, other examples of kickstand assemblies of the present disclosure can include one or more additional backplate accessory magnet(s) that are located and configured to attract one or more additional corresponding frame accessory magnet(s) in a frame of a foldable computing device.

In other examples, kickstand assemblies of the present disclosure are integrated into one of the frames of the foldable computing device (i.e., not removable). In one example and with reference now to FIG. 3, the backplate of the kickstand assembly 10' is also a rear face 15 of the first frame 14 of the foldable computing device 12. In this example and as described in more detail below, the kickstand assembly 10' translates relative to the first frame 14 within first and second slots 26, 28 located in the rear face 15 of the first frame.

With reference now to FIGS. 1, 2, 4, and 8, as described further below and in another potential advantage of the present disclosure, the kickstand assembly 10 includes magnets that automatically deploy a lower kickstand plate 32 when a user laterally slides the assembly from a home position (shown in FIG. 1) to a deployed position (shown in FIGS. 2 and 8). Advantageously, in this manner the kickstand assembly 10 enables a user to easily and conveniently deploy the lower kickstand plate by simply laterally sliding an upper kickstand plate relative to the underlying backplate 20.

Additionally, and in another potential advantage of the present disclosure, in addition to automatically deploying the lower kickstand plate 32, the lateral movement of the kickstand assembly 10 also repositions the kickstand plate near the middle of the first frame 14 and second frame 16 in their end-to-end (open) orientation as shown in FIGS. 2 and 8. Advantageously, by repositioning the middle of the kickstand assembly 10 at or near the folding axis 17 of the two frames, the kickstand assembly is positioned to provide a centered, stable support surface against which the two frames are supported. Accordingly, this stable positioning allows the user to place the frames on a horizontal surface, such as a table, at a stable and convenient angle for the user.

Figure 7:
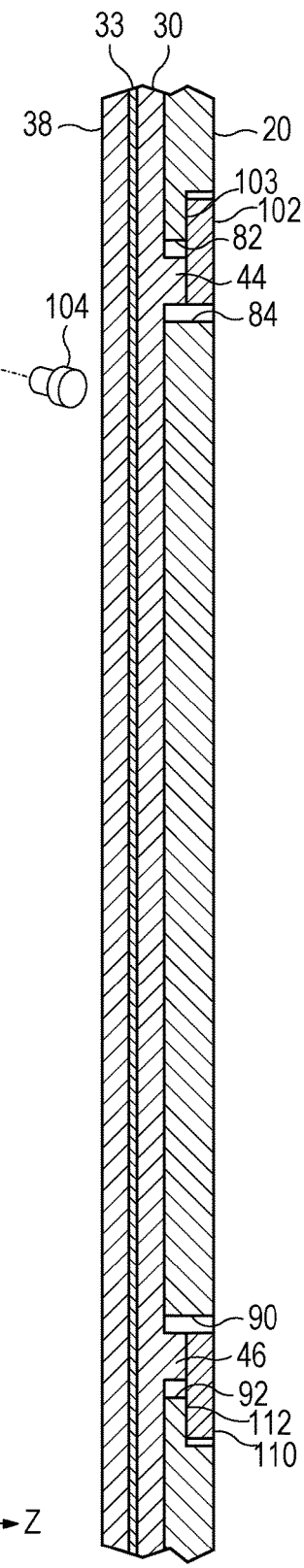
FIG. 7 shows a cross-section view taken along lines 7-7 in FIG. 4.

In the present example and with reference to FIGS. 2 and 8, the kickstand assembly 10 comprises an upper kickstand plate 30 that is rotatably coupled to a lower kickstand plate 32. In this example, the upper kickstand plate 30 and lower kickstand plate 32 are rotatably coupled via a living hinge 31. With reference also to FIG. 7, in this example the living hinge 31 comprises a flexible substrate 33, such as a polyester film, to which the upper kickstand plate 30 and lower kickstand plate 32 are affixed, such as via an adhesive. In other examples, a variety of other materials and structures can be utilized to rotatably couple the upper kickstand plate 30 to the lower kickstand plate 32.

In the present example, an upper outer panel 38 is affixed to the upper portion of the flexible substrate 33 overlying the upper kickstand plate 30. Similarly, a lower outer panel 40 is affixed to a lower portion of the flexible substrate 33 overlying the lower kickstand plate 32.

As noted above, the upper kickstand plate 30 is slidably connected to the backplate 20. More particularly, in this example the backplate 20 comprises a first slot 26 and a second slot 28 that are parallel to one another and spaced apart in the y-axis direction. With reference to FIGS. 4, 5, 6, and 8, the upper kickstand plate 30 comprises a first slider 44 that protrudes from the plate and is slidably received in the first slot 26 of the backplate 20. With reference also to FIG. 7, the upper kickstand plate 30 also comprises a second slider 46 that protrudes from the upper kickstand plate and is slidably received in the second slot 28 of the backplate 20. The first slider 44 and second slider 46 are spaced apart in the y-axis direction by the same distance as the first slot 26 and the second slot 28. Advantageously and as described further below, this configuration enables the upper kickstand plate 30 (and attached lower kickstand plate 32) to slide laterally in the x-axis direction relative to the backplate 20 and first frame 14 of the foldable computing device 12. In other examples, kickstand assemblies of the present disclosure can include three, four, or more pairs of sliders and corresponding slots as described herein.

In the present example the first slider 44 and second slider 46 are integrally fabricated with the upper kickstand plate 30, such as via additive manufacturing techniques. Advantageously, integrally fabricating the sliders with the upper kickstand plate 30 enables more precise dimensional tolerancing and greater accuracy in positioning the sliders on the upper kickstand plate to mate with the corresponding first slot 26 and second slot 28 in the backplate 20. In other examples, kickstand assemblies of the present disclosure utilize a first slider 44 and second slider 46 that are separate components affixed to the upper kickstand plate 30. For example, the first slider 44 and second slider 46 can be affixed to the upper kickstand plate 30 via pins extending through apertures in each end of each slider.

Figure 5:
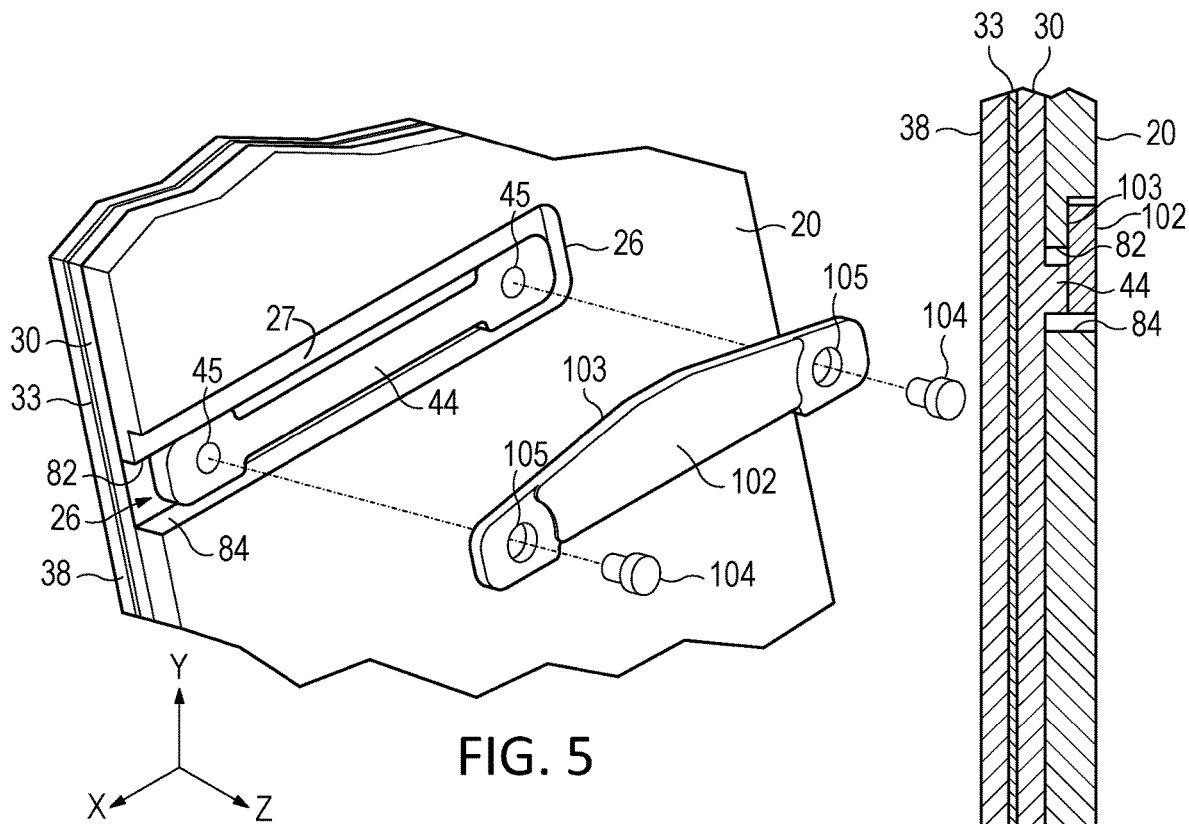
FIG. 5 shows an exploded partial view of a portion of the kickstand assembly of FIG. 1.
Figure 6:
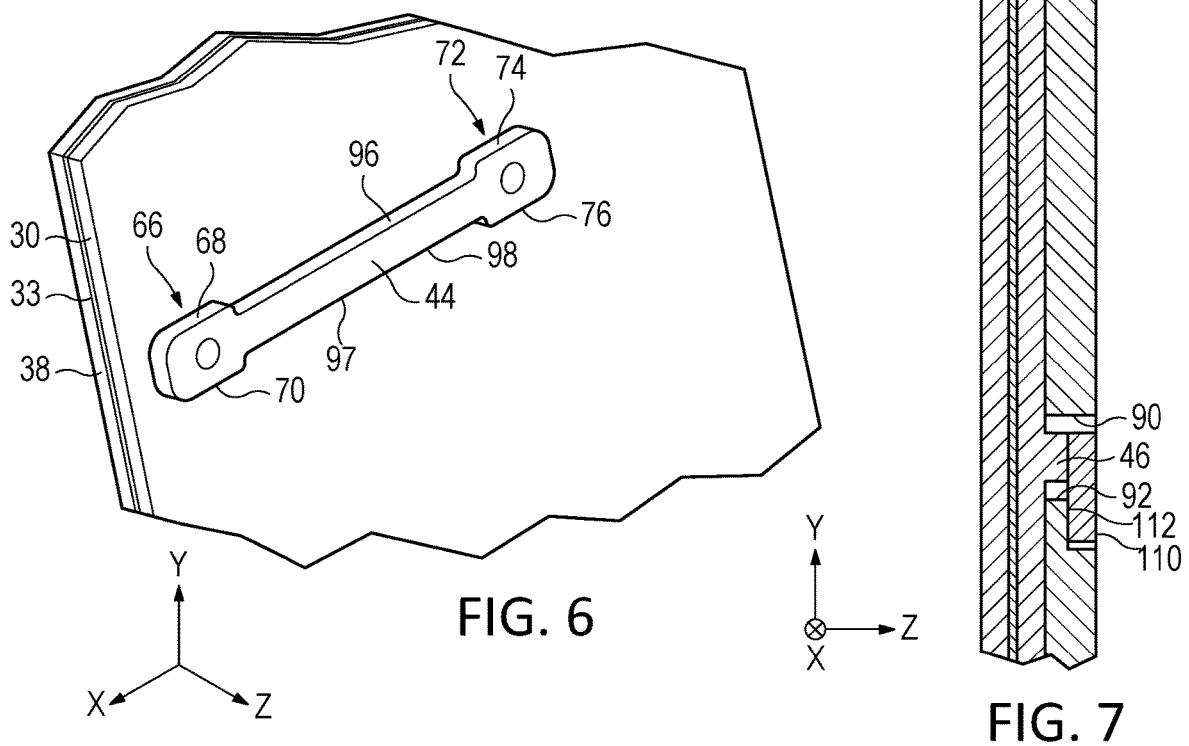
FIG. 6 shows a view of the slider and upper kickstand plate of the kickstand assembly of FIG. 5.

With reference now to FIGS. 5 and 6, an example structure of the first slider 44 is now provided. In the present example, the second slider 46 has the same shape and structure as the first slider 44. As shown in FIG. 6, the first slider 44 comprises an elongated member 64 that comprises a first end 66 comprising a first slider upper bearing surface 68 and a first slider lower bearing surface 70, and a second end 72 comprising a second slider upper bearing surface 74 and a second slider lower bearing surface 76. Between the first slider upper bearing surface 68 and the second slider upper bearing surface 74 is an upper recessed relief surface 96. Similarly, between the first slider lower bearing surface 70 and the second slider lower bearing surface 76 is a lower recessed relief surface 97. In one potential advantage of the present configuration and as described further below, by spacing the upper and lower bearing surfaces between elongated recessed relief surfaces, the first slider 44 (and second slider 46) embody spaced-apart slider surface areas that contact upper and lower slot surfaces at laterally separated locations within the slot. Advantageously, such spacings help reduce torsional forces exerted on the sliders when the upper kickstand plate 30 is translated, which correspondingly reduces the potential for the sliders to bind or jam within the slots.

As best seen in FIGS. 5-7, in this example the first slider upper bearing surface 68 and the second slider upper bearing surface 74 are in sliding contact with a first slot upper bearing surface 82 of the first slot 26. In a similar manner, the first slider lower bearing surface 70 and the second slider lower bearing surface 76 are in sliding contact with a first slot lower bearing surface 84 of the first slot 26. Accordingly, and in one potential advantage of the present disclosure, this configuration constrains the first slider 44, second slider 46, and upper kickstand plate 30 to translate back and forth in the x-axis direction to enable the user to easily move the kickstand assembly and automatically deploy the lower kickstand plate 32 (as described further below).

In other examples, the distance between the first slot upper bearing surface 82 and the first slot lower bearing surface 84 is slightly greater than the distance between the first slider upper bearing surface 68 and the first slider lower bearing surface 70, and similarly slightly greater than the distance between the second slider upper bearing surface 74 and the second slider lower bearing surface 76. In one potential advantage of these examples, the first slider 44 and second slider 46 have a slight freedom of movement in the y-axis direction to provide for lower frictional engagement and reduced possibilities of binding during movement in the x-axis direction.

To retain the first slider 44 within the first slot 26, a first capture member 102 is affixed to the first slider 44. In this example, pins 104 extend through apertures 105 in the capture member 102 and into apertures 45 in the first slider 44 to retain the first slider within the first slot 26. With reference to FIGS. 5 and 7, a rear face 103 of the first capture member 102 rests against a first shelf 27 within the first slot 26. Advantageously, in this configuration the first capture member 102 retains the first slider 44 within the first slot 26, which correspondingly retains and enables the kickstand assembly 10 to translate laterally with respect to the backplate 20.

Figure 4:
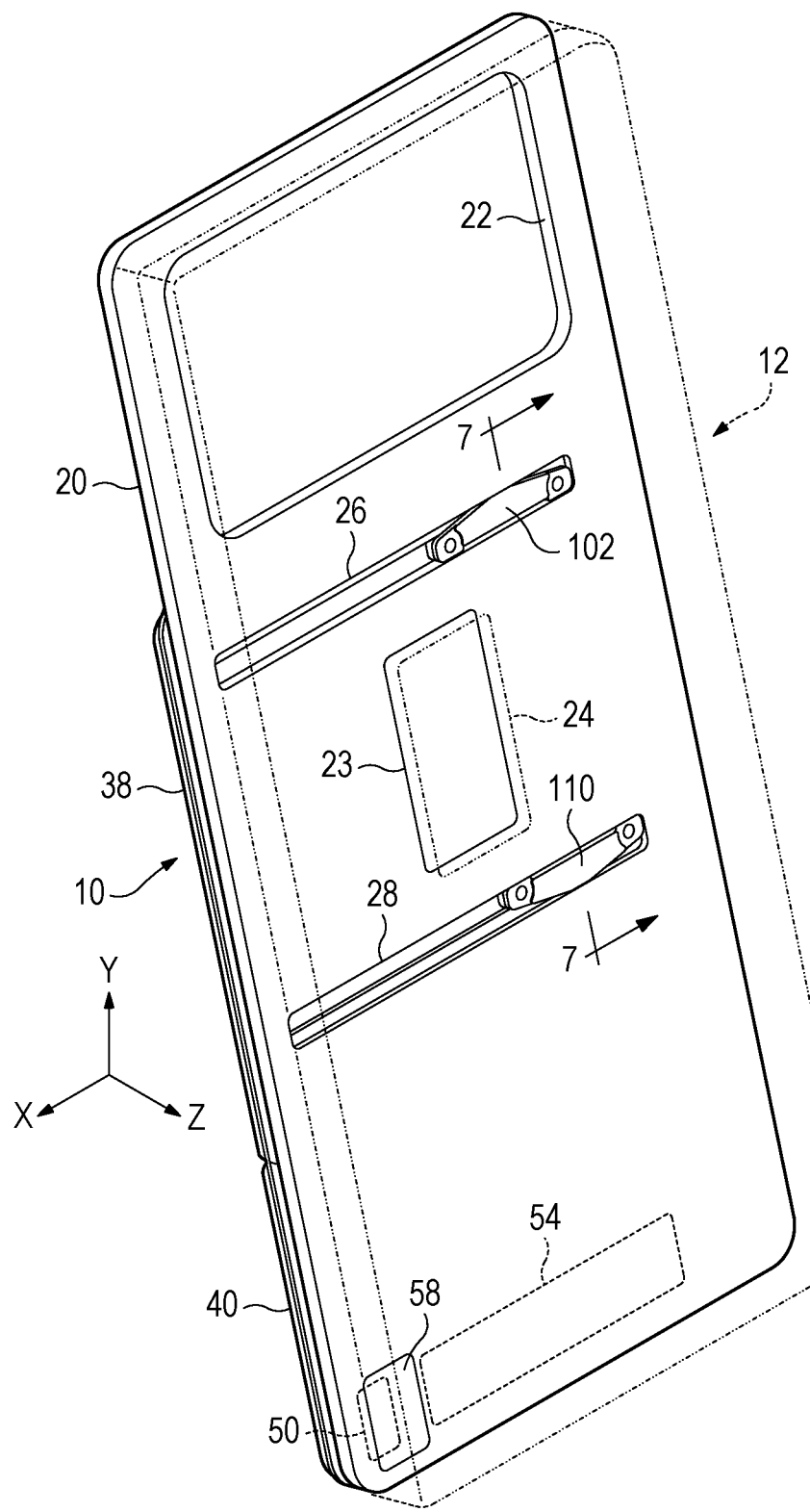
FIG. 4 shows another view of the kickstand assembly of FIG. 1.

With reference to FIGS. 4, 7, and 8, the second slider 46 is similarly retained within the second slot 28 by a second capture member 110 via pins 104. A rear face 112 of the second capture member 110 rests against a second shelf 29 within the second slot 28. As described above, the second capture member 110 retains the second slider 46 within the second slot 28, which correspondingly retains and enables the kickstand assembly 10 to translate laterally with respect to the backplate 20.

As noted above, and in another potential advantage of the present disclosure, magnets automatically deploy the lower kickstand plate 32 when a user laterally slides the assembly from the home position of FIG. 1 to the deployed position as shown in FIGS. 2 and 8. More particularly and with reference to FIGS. 4 and 8, in this example the backplate 20 includes a backplate deploy magnet 58 that has a first magnetic pole orientation. The lower kickstand plate 32 includes a closing magnet 50 that has a second magnetic pole orientation that attracts the first magnetic pole orientation of the backplate deploy magnet 58.

Accordingly, as shown in FIG. 4 and in another potential advantage of the present disclosure, the closing magnet 50 of the lower kickstand plate 32 overlies and magnetically attracts the backplate deploy magnet 58 in the backplate 20 to releasably secure the lower kickstand plate to the backplate when the lower kickstand plate is in the home position relative to the backplate. In this example, the home position corresponds to the position of the kickstand assembly 10 in FIGS. 1 and 4, with the lower kickstand plate 32 parallel with the upper kickstand plate 30 (i.e., not deployed). Advantageously, this configuration holds the lower kickstand plate 32 flush with the backplate surface when the lower kickstand plate is in the home position. Additionally and in some examples, while in this home position the lower kickstand plate 32 can be manually deployed by a user grasping and pulling the lower kickstand plate outwardly to overcome the magnetic attractions between the closing magnet 50 and the backplate deploy magnet 58.

As shown in FIGS. 4 and 8, the lower kickstand plate 32 also includes an opening magnet 54 spaced laterally from the closing magnet 50. The opening magnet 54 has the first magnetic pole orientation of the backplate deploy magnet 58. In this manner, when the upper kickstand plate 30 is laterally translated in the positive x-axis direction relative to the backplate 20 from the home position toward the deployed position of FIGS. 2 and 8, the backplate deploy magnet 58 repels the opening magnet 54 to cause the lower kickstand plate 32 to rotate about the upper kickstand plate into the angled, deployed position as shown in FIGS. 2 and 8. Accordingly, and in another potential advantage of the present disclosure, this configuration automatically deploys the lower kickstand plate 32 when the upper kickstand plate 30 is laterally translated away from the home position in the positive x-axis direction. It follows that this configuration both automatically deploys the lower kickstand plate 32 and repositions the kickstand plate to a position more aligned with the center of gravity of the two frames in the end-to-end orientation, thereby providing a more stable and secure angled positioning of the foldable computing device 12.

In other examples, kickstand assemblies of the present disclosure utilize slots in the upper kickstand plate and sliders protruding from the backplate. With reference now to FIGS. 9-13, in one example a kickstand assembly 200 comprises a backplate 220 that includes a first slider 244 and a second slider 246 protruding from the backplate. The first slider 244 is slidably received in a first slot 226 located in the upper kickstand plate 230. Similarly, the second slider 246 is slidably received in a second slot 228 located in the upper kickstand plate 230. The first slider 244 and second slider 246 are spaced apart in the y-axis direction by the same distance as the first slot 226 and the second slot 228. Advantageously and like the configuration described above, this configuration enables the upper kickstand plate 230 and lower kickstand plate 232 to slide laterally in the x-axis direction relative to the backplate 20 and first frame 14 of the foldable computing device 12. In other examples of this configuration, kickstand assemblies of the present disclosure can include three, four, or more pairs of sliders and corresponding slots as described herein.

In the present example the first slider 244 and second slider 246 are integrally fabricated with the backplate 220, such as via additive manufacturing techniques. Advantageously and as noted above, integrally fabricating the sliders with the backplate 220 enables more precise dimensional tolerances and greater accuracy in positioning the sliders on the backplate to mate with the corresponding first slot 226 and second slot 228 in the upper kickstand plate 230. In other examples, kickstand assemblies of the present disclosure utilize a first slider 244 and second slider 246 that are separate components affixed to the backplate 220.

In this example, and in one potential advantage as described above, the backplate 220 is a separate structure that is removably attached to the foldable computing device 12. More particularly, in this example and with reference to FIGS. 9 and 10, the backplate 220 comprises a backplate accessory magnet 223 that is configured to attract a corresponding frame accessory magnet 224 located in the first frame 14 of the foldable computing device 12. Advantageously, this configuration allows a user to conveniently and easily attach or detach the kickstand assembly 200 from the foldable computing device 12.

In other examples, the backplate accessory magnet 223 can be positioned in a variety of other locations in the backplate 220 to correspond with a location of a corresponding frame accessory magnet 224 in the first frame of the foldable computing device. Additionally or alternatively, other examples of kickstand assemblies of the present disclosure can include one or more additional backplate accessory magnet(s) that are located and configured to attract one or more additional corresponding frame accessory magnet(s) in a frame of a foldable computing device. In other examples of this configuration and as described above, kickstand assemblies of the present disclosure are integrated into one of the frames of the foldable computing device (i.e., not removable).

Figure 11:
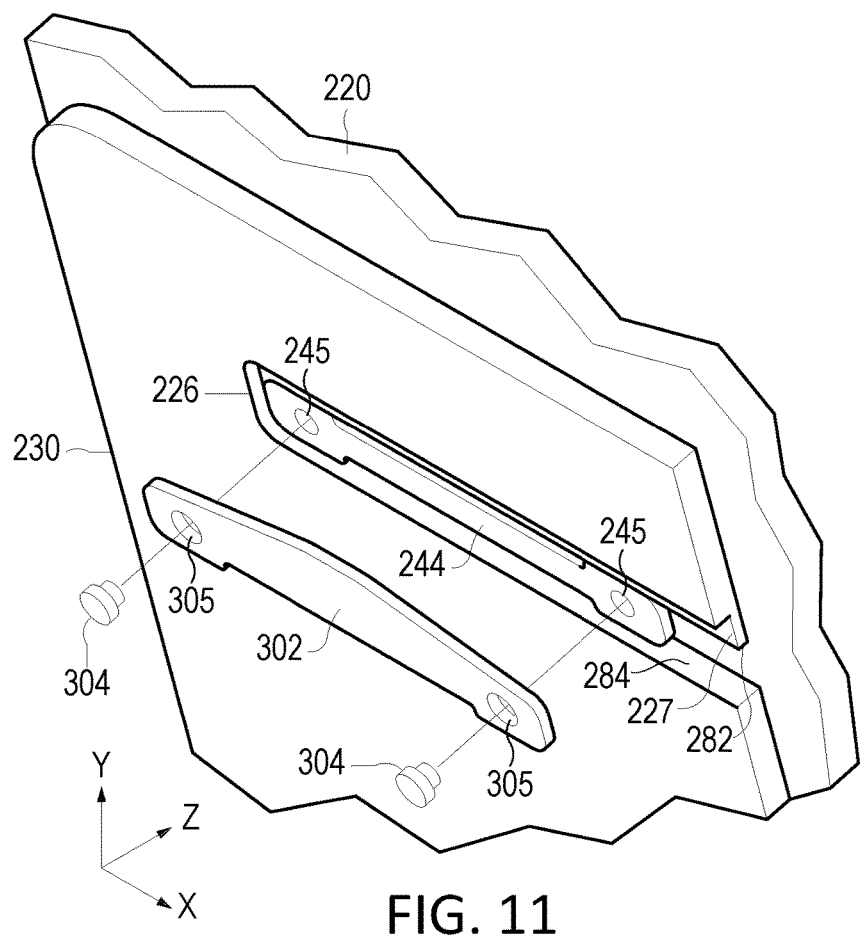
FIG. 11 shows an exploded partial view of a portion of the kickstand assembly of FIG. 10.
Figure 12:
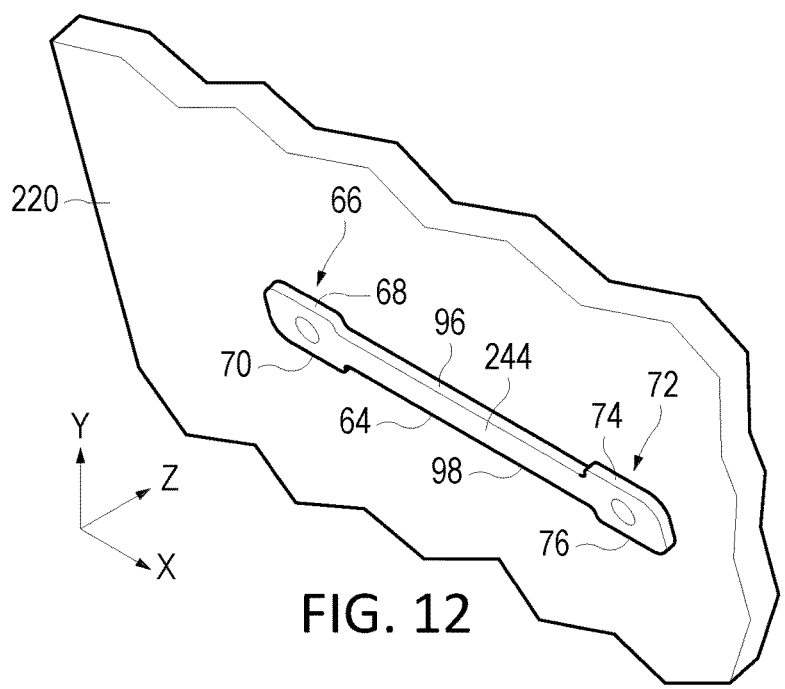
FIG. 12 shows a view of the slider and backplate of the kickstand assembly of FIG. 11.
Figure 13:
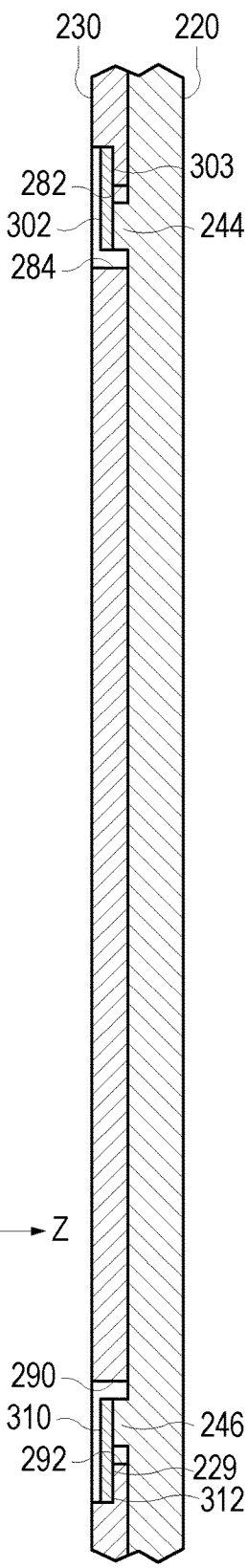
FIG. 13 shows a cross-section view taken along lines 13-13 in FIG. 9.

With reference now to FIGS. 11-13, an example structure of the first slider 244 is now provided. In the present example, the first slider 244 has the same shape and structure as the first slider 44 described above. Accordingly, reference numerals denoting the same structures are utilized. Additionally, the second slider 246 has the same shape and structure as the first slider 244.

As shown in FIG. 12, the first slider 244 comprises an elongated member 64 that comprises a first end 66 comprising a first slider upper bearing surface 68 and a first slider lower bearing surface 70, and a second end 72 comprising a second slider upper bearing surface 74 and a second slider lower bearing surface 76. Between the first slider upper bearing surface 68 and the second slider upper bearing surface 74 is an upper recessed relief surface 96. Similarly, between the first slider lower bearing surface 70 and the second slider lower bearing surface 76 is a lower recessed relief surface 97. As noted above, by spacing the upper and lower bearing surfaces between elongated recessed relief surfaces, the first slider 244 (and second slider 246) create distanced slider surface areas that contact upper and lower slot surfaces at spaced-apart locations within the slot. Advantageously, such spacings help reduce torsional forces exerted on the sliders which correspondingly reduces the potential for the sliders to bind or jam within the slots.

As best seen in FIGS. 11-13, in this example the first slider upper bearing surface 68 and the second slider upper bearing surface 74 are in sliding contact with a first slot upper bearing surface 282 of the first slot 226. In a similar manner, the first slider lower bearing surface 70 and the second slider lower bearing surface 76 are in sliding contact with a first slot lower bearing surface 284 of the first slot 226. Accordingly and like the example described above, the first slider 244, second slider 246, and upper kickstand plate 230 are constrained to translate in the x-axis direction to enable the user to easily move the kickstand assembly 200 and automatically deploy the lower kickstand plate 232 as described herein.

In other examples, the distance between the first slot upper bearing surface 282 and the first slot lower bearing surface 284 is slightly greater than the distance between the first slider upper bearing surface 68 and the first slider lower bearing surface 70, and similarly slightly greater than the distance between the second slider upper bearing surface 74 and the second slider lower bearing surface 76. In one potential advantage of these examples, the first slider 244 and second slider 246 have a slight freedom of movement in the y-axis direction to provide for reduced frictional engagement and a lower likelihood of binding in the x-axis direction.

To retain the first slider 244 within the first slot 226, a first capture member 302 is affixed to the first slider 244. In this example, pins 304 extend through apertures 305 in the first capture member 302 and into apertures 245 in the first slider 244 to retain the first slider within the first slot 226. With reference to FIGS. 11 and 13, a rear face 303 of the first capture member 302 rests against a first shelf 227 within the first slot 226. Advantageously, in this configuration the first capture member 302 retains the first slider 244 within the first slot 226, which correspondingly retains and enables the kickstand assembly 200 to translate laterally with respect to the backplate 20.

Figure 9:
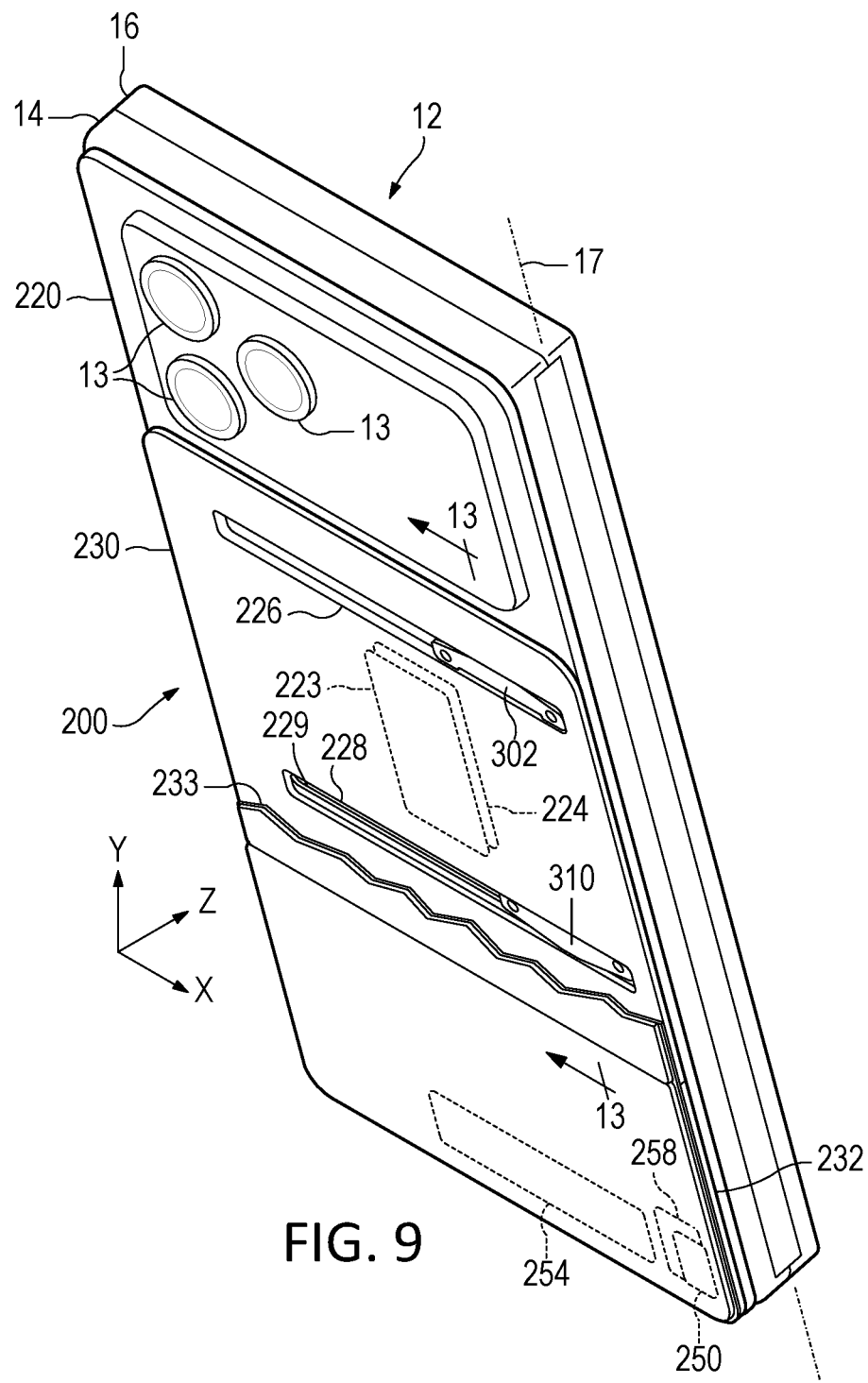
FIG. 9 shows another example of a kickstand assembly mounted to a foldable computing device according to examples of the present disclosure.
Figure 10:
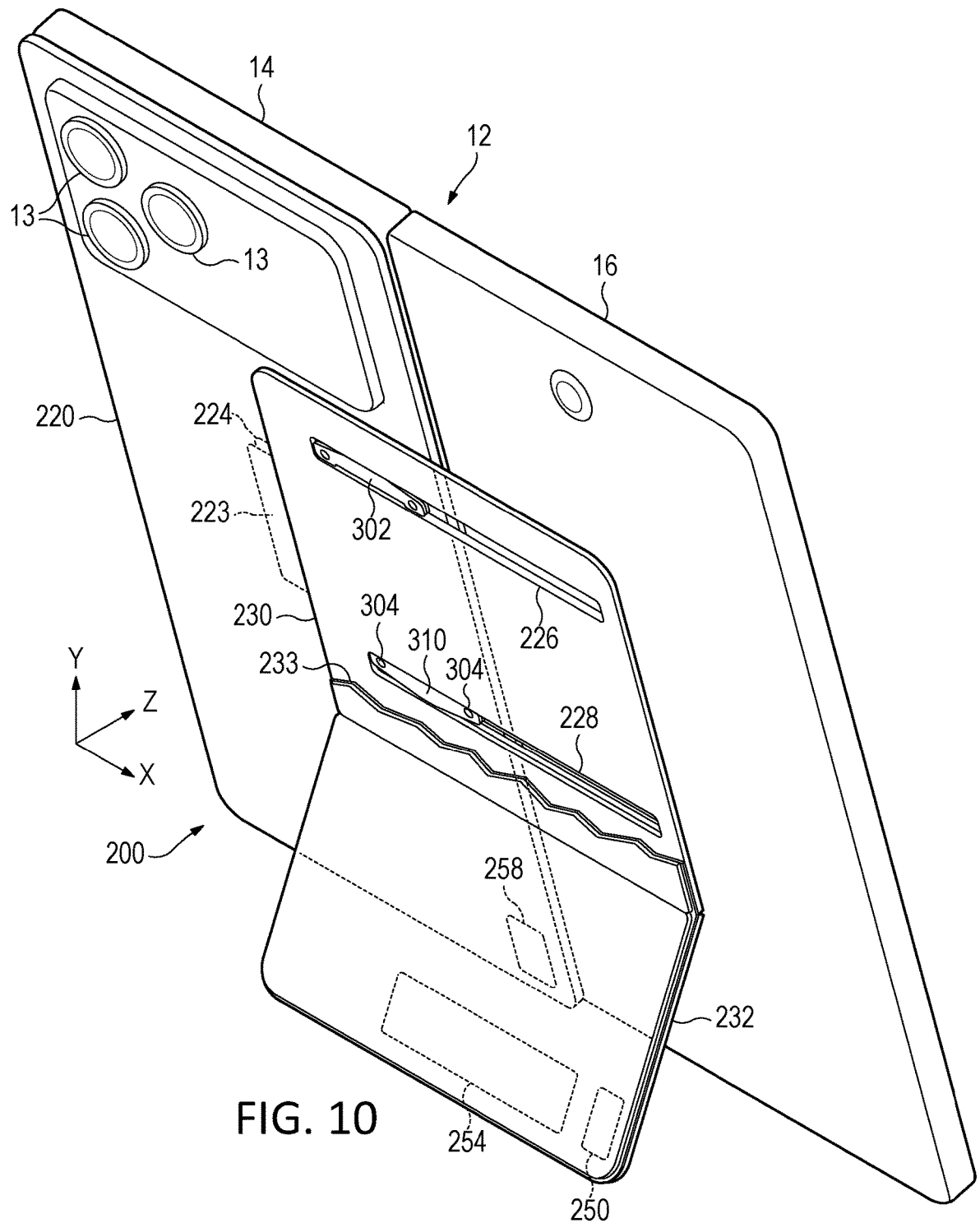
FIG. 10 shows the kickstand assembly of FIG. 9 in a deployed position.

With reference to FIGS. 9, 10, and 13, the second slider 246 is similarly retained within the second slot 228 by a second capture member 310 via pins 304. A rear face 312 of the second capture member 310 rests against a second shelf 229 within the second slot 228. As described above, the second capture member 310 retains the second slider 246 within the second slot 228, which correspondingly retains and enables the kickstand assembly 200 to translate laterally with respect to the backplate 20.

As described above, magnets automatically deploy the lower kickstand plate 232 when a user laterally slides the assembly from the home position of FIG. 9 to a deployed position as shown in FIG. 10. In this configuration, the backplate 220 includes a backplate deploy magnet 258 that has a first magnetic pole orientation. The lower kickstand plate 232 includes a closing magnet 250 that has a second magnetic pole orientation that attracts the first magnetic pole orientation of the backplate deploy magnet 258.

Accordingly, and in the same manner as described above, the closing magnet 250 of the lower kickstand plate 232 overlies and magnetically attracts the backplate deploy magnet 258 in the backplate 220 to releasably secure the lower kickstand plate to the backplate when the lower kickstand plate is in the home position relative to the backplate as shown in FIG. 9.

The lower kickstand plate 232 also includes an opening magnet 254 spaced laterally from the closing magnet 250. The opening magnet 254 has the first magnetic pole orientation of the backplate deploy magnet 258. In this manner, when the upper kickstand plate 230 is laterally translated in the positive x-axis direction relative to the backplate 220 from the home position toward the deployed position of FIG. 10, the backplate deploy magnet 258 repels the opening magnet 254 to cause the lower kickstand plate 232 to rotate about the upper kickstand plate into the angled, deployed position as shown in FIG. 10.

Accordingly, and in another potential advantage of the present disclosure, this configuration automatically deploys the lower kickstand plate 232 when the upper kickstand plate 230 is laterally translated away from the home position in the positive x-axis direction. It follows that this configuration both automatically deploys the lower kickstand plate 232 and repositions the kickstand plate to a position more aligned with the center of gravity of the two frames in the end-to-end orientation, thereby providing a more stable and secure angled positioning of the foldable computing device 12.

Figure 14:
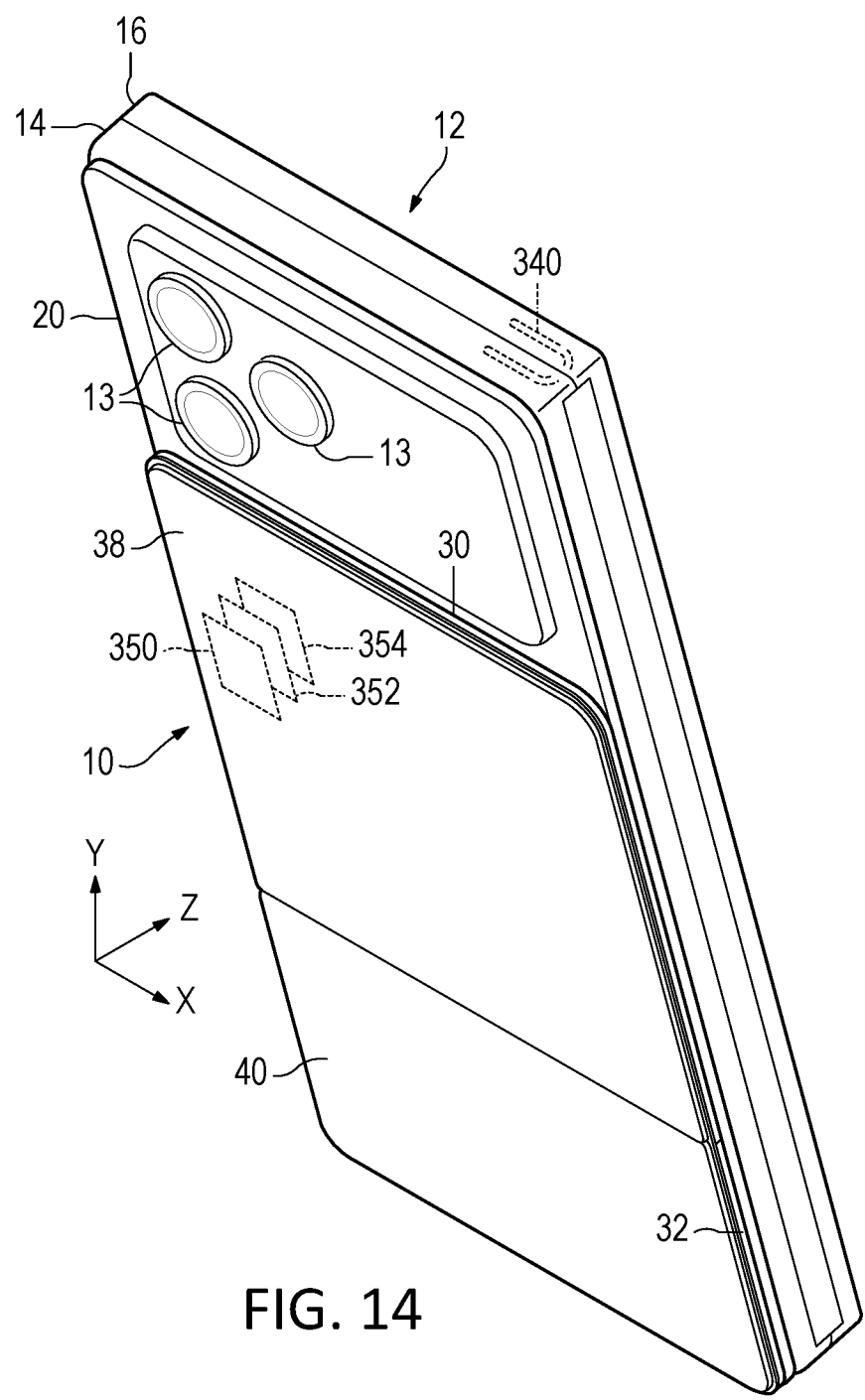
FIG. 14 shows another example of a kickstand assembly according to examples of the present disclosure.
Figure 15:
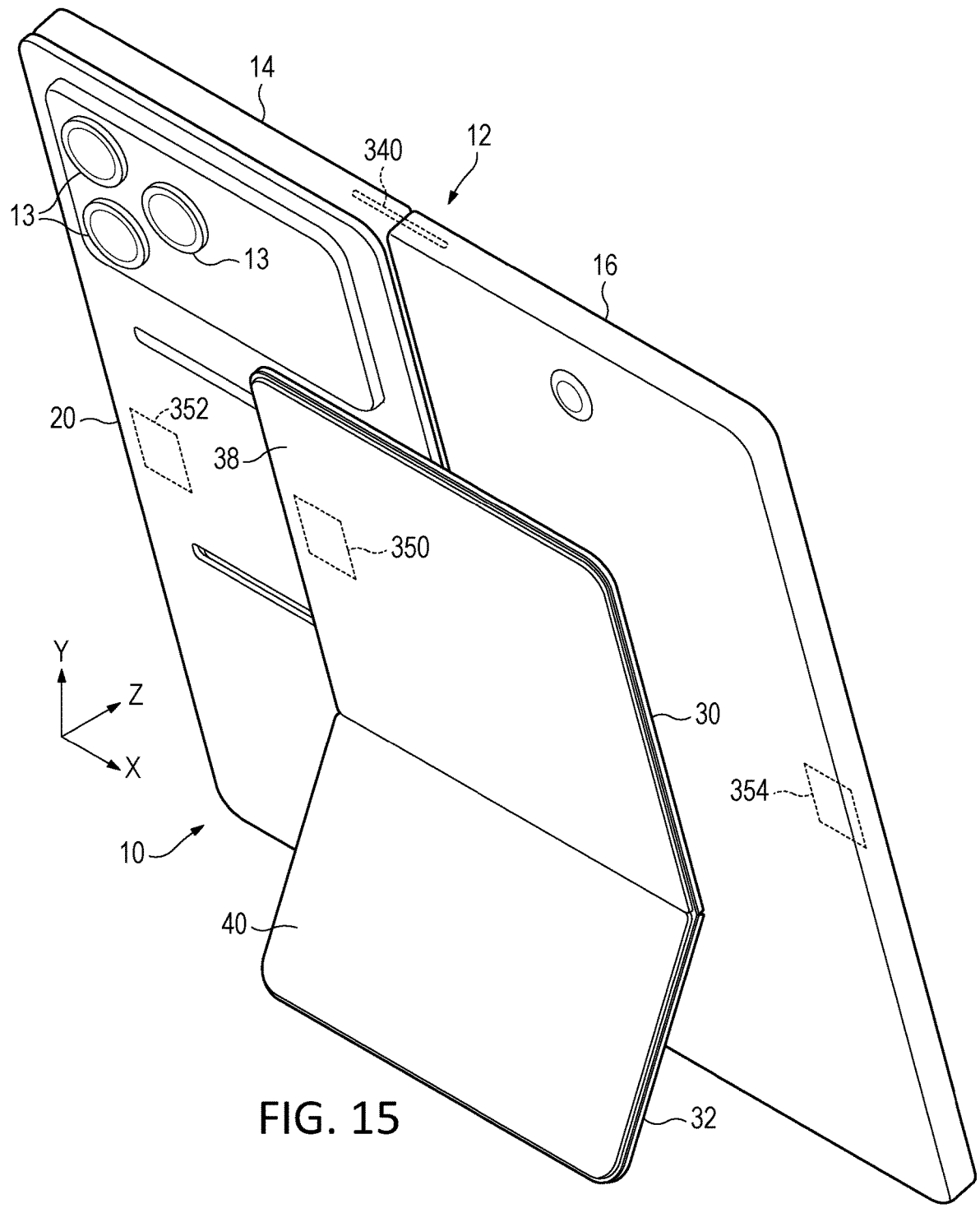
FIG. 15 shows the kickstand assembly of FIG. 14 in a deployed position.

With reference now to FIGS. 14-15, in some examples kickstand assemblies of the present disclosure are also configured to magnetically assist with opening and closing of the foldable computing device 12. In the example of FIG. 14, the foldable computing device 12 includes a biaser that biases the first frame 14 and the second frame 16 to rotate open from the closed orientation. In the present example, the biaser comprises a leaf spring 340 that extends between the first frame 14 and the second frame 16. In other examples, a wide variety of biasing components may be utilized to bias the first frame 14 and the second frame 16, such as coil springs, elastomeric members, magnets, etc.

In this example, the upper kickstand plate 30 of the kickstand assembly 10 includes a kickstand releasing magnet 350 having a kickstand magnetic pole orientation. When the upper kickstand plate 30 is in the home position relative to the backplate 20 and the first frame 14 and the second frame 16 are in a closed orientation as shown in FIG. 14, the kickstand releasing magnet 350 overlies a backplate retention magnet 352 in the backplate 20 and a frame retention magnet 354 in the second frame of the foldable computing device 12. The kickstand releasing magnet 350 and the backplate retention magnet 352 are configured to have combined magnetic pole orientations that attract the frame retention magnet 354 with a force that slightly exceeds the torsional force produced by leaf spring 340 tending to open the two frames. Accordingly, and in one potential advantage of this configuration, the kickstand releasing magnet 350 and backplate retention magnet 352 cooperate with the frame retention magnet 354 to removably retain the second frame 16 of the foldable computing device 12 against the first frame 14 in the closed orientation as shown in FIG. 14.

With reference to FIG. 15, when the upper kickstand plate 30 is laterally translated in the x-axis direction, the kickstand releasing magnet 350 is moved away from overlying the backplate retention magnet 352 and the frame retention magnet 354, thereby enabling the leaf spring 340 to begin separating and opening the first frame 14 and second frame 16 from the closed orientation. Advantageously in this example, translating the upper kickstand plate 30 in the x-axis direction relative to the backplate 20 automatically opens the two frames from the closed orientation in addition to repositioning and automatically deploying the lower kickstand plate 32 as described above.

As noted above, the kickstand assembly 10 includes magnets that automatically deploy a lower kickstand plate 32 when a user laterally slides the assembly from a home position (shown in FIG. 1) to a deployed position (shown in FIGS. 2 and 8). Advantageously, in this manner the kickstand assembly 10 enables a user to easily and conveniently deploy the lower kickstand plate by simply laterally sliding an upper kickstand plate relative to the underlying backplate 20.

Additionally, and in another potential advantage of the present disclosure, in addition to automatically deploying the lower kickstand plate 32, the lateral movement of the kickstand assembly 10 also repositions the kickstand plate near the middle of the first frame 14 and second frame 16 in their end-to-end (open) orientation as shown in FIGS. 2 and 8. Advantageously, by repositioning the middle of the kickstand assembly 10 at or near the folding axis 17 of the two frames, the kickstand assembly is positioned to provide a centered, stable support surface against which the two frames are supported. Accordingly, this stable positioning allows the user to place the frames on a horizontal surface, such as a table, at a stable and convenient angle for the user.

In some examples, and in another potential advantage of the present disclosure, the kickstand assembly includes one or more additional magnets that release and/or bias the first frame and the second frame to rotate open from the closed orientation when the kickstand assembly is laterally translated relative to the backplate/first frame. With reference now to FIGS. 16-18 and in the context of kickstand assembly 10, in some examples the upper kickstand plate 30 includes a device opening magnet 62 having a magnetic pole orientation that repels a frame opening magnet 63 in the second frame 16. As shown in FIGS. 16 and 17, when the first frame 14 and second frame 16 are in the closed orientation, the device opening magnet 62 is laterally spaced from the frame opening magnet 63 in the x-axis direction such that it does not overlie the frame opening magnet 63.

Figure 19:
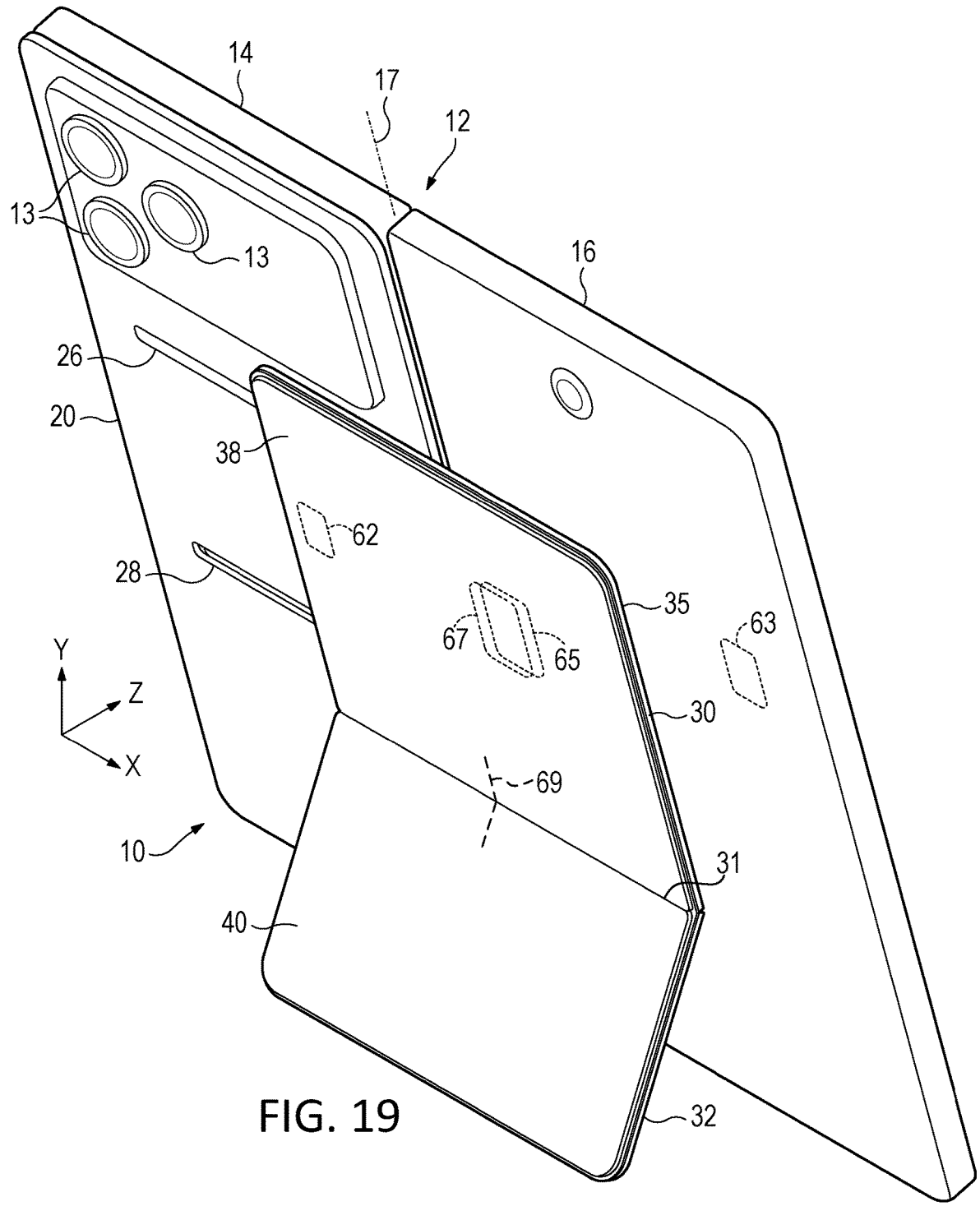
FIG. 19 shows the kickstand assembly of FIG. 16 in a deployed position.

As shown in FIG. 18, as the kickstand assembly and upper kickstand plate 30 are translated in the x-axis direction, the device opening magnet 62 passes over and closer to the frame opening magnet 63, thereby increasing the repelling force between the two magnets and correspondingly causing the first frame 14 and second frame 16 to rotate open from the closed orientation. FIG. 19 illustrates the foldable computing device 12 in the open orientation with the kickstand assembly 10 fully deployed. Accordingly, and in one potential advantage of this configuration, the kickstand assembly functions to both automatically deploy the lower kickstand plate 32 and to release the first frame 14 and the second frame 16 to rotate open from the closed orientation. While this example is described with respect to the kickstand assembly 10, it will be appreciated that an upper kickstand plate that includes a device opening magnet and a second frame that includes a frame opening magnet as described above can be utilized with kickstand assembly 200 and any other embodiments and features of kickstand assemblies.

Figure 20:
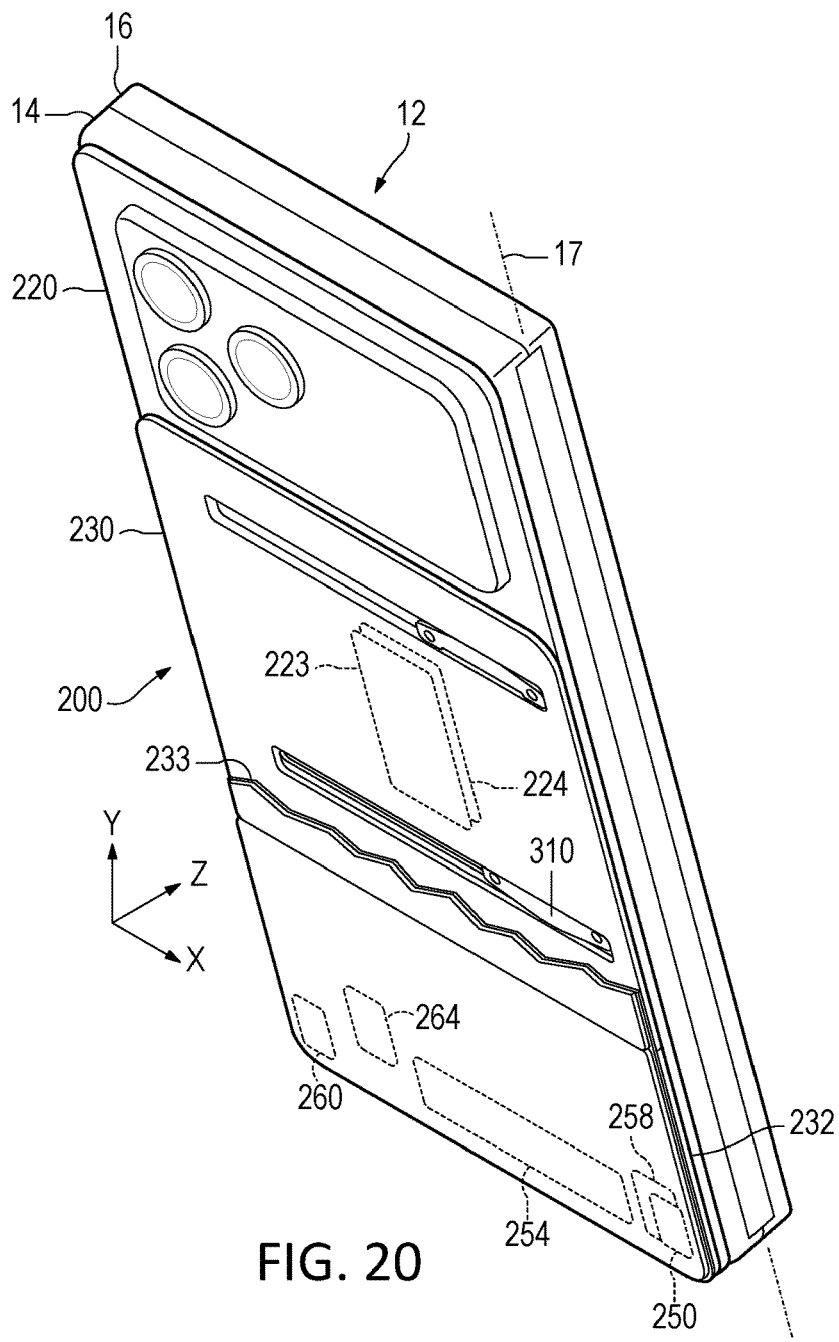
FIG. 20 shows another example of a kickstand assembly utilizing magnets in a lower portion to bias the first frame and the second frame to rotate open according to examples of the present disclosure.
Figure 21:
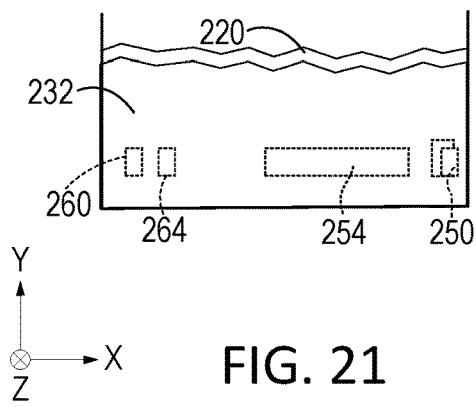
FIG. 21 shows a partial view of the lower kickstand plate and opening magnets of the kickstand assembly of FIG. 20 in the closed orientation.
Figure 22:
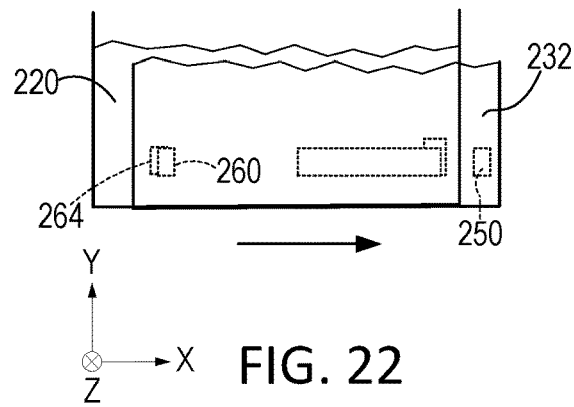
FIG. 22 shows the lower kickstand plate translated in the x-axis direction.

In some examples, one or more magnets that bias the first frame and the second frame to rotate open from the closed orientation can be located in the lower kickstand plate of the kickstand assembly. With reference now to FIGS. 20-22, and in the context of kickstand assembly 200, in some examples the lower kickstand plate 232 includes a device opening magnet 260 having a magnetic pole orientation that repels a frame opening magnet 264 in the second frame 16. As shown in FIGS. 20 and 121, when the first frame 14 and second frame 16 are in the closed orientation, the device opening magnet 260 is laterally spaced from the frame opening magnet 264 in the x-axis direction such that it does not overlie the frame opening magnet 264.

Figure 23:
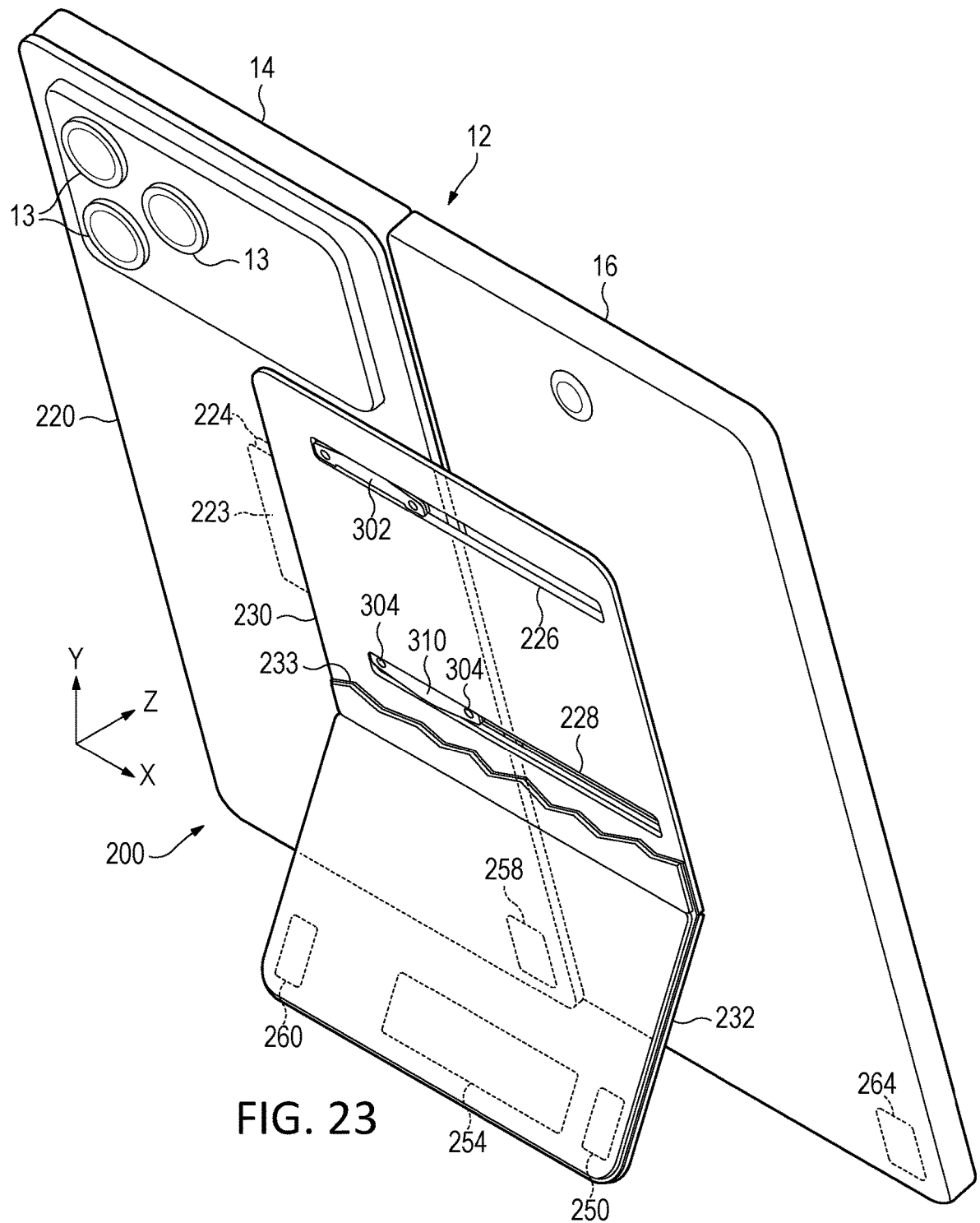
FIG. 23 shows the kickstand assembly of FIG. 20 in a deployed position.

As shown in FIG. 22, as the kickstand assembly and lower kickstand plate 232 are translated in the x-axis direction, the device opening magnet 260 passes over and closer to the frame opening magnet 264, thereby increasing the repelling force between the two magnets and correspondingly causing the first frame 14 and second frame 16 to rotate open from the closed orientation. FIG. 23 illustrates the foldable computing device 12 in the open orientation with the kickstand assembly 200 fully deployed. Accordingly, and in one potential advantage of this configuration, the kickstand assembly functions to both automatically deploy the lower kickstand plate 232 and to release and bias the first frame 14 and the second frame 16 from the closed orientation. While this example is described with respect to the kickstand assembly 200, it will be appreciated that a lower kickstand plate that includes a device opening magnet and a second frame that includes a frame opening magnet as described above can be utilized with kickstand assembly 10 and any other embodiments and features of kickstand assemblies.

Figure 24:
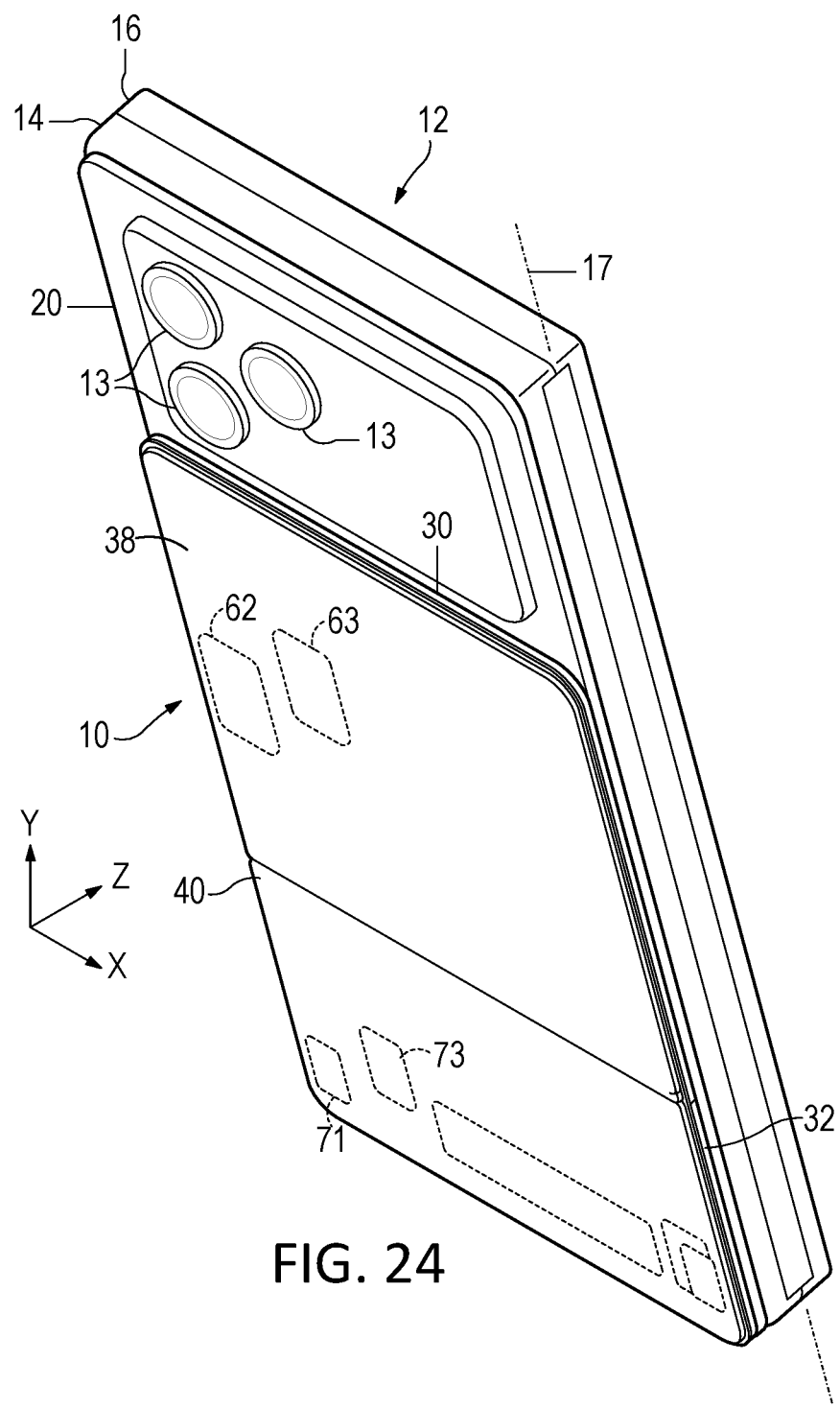
FIG. 24 shows another example of a kickstand assembly utilizing magnets in upper and lower portions to bias the first frame and the second frame to rotate open according to examples of the present disclosure.
Figure 25:
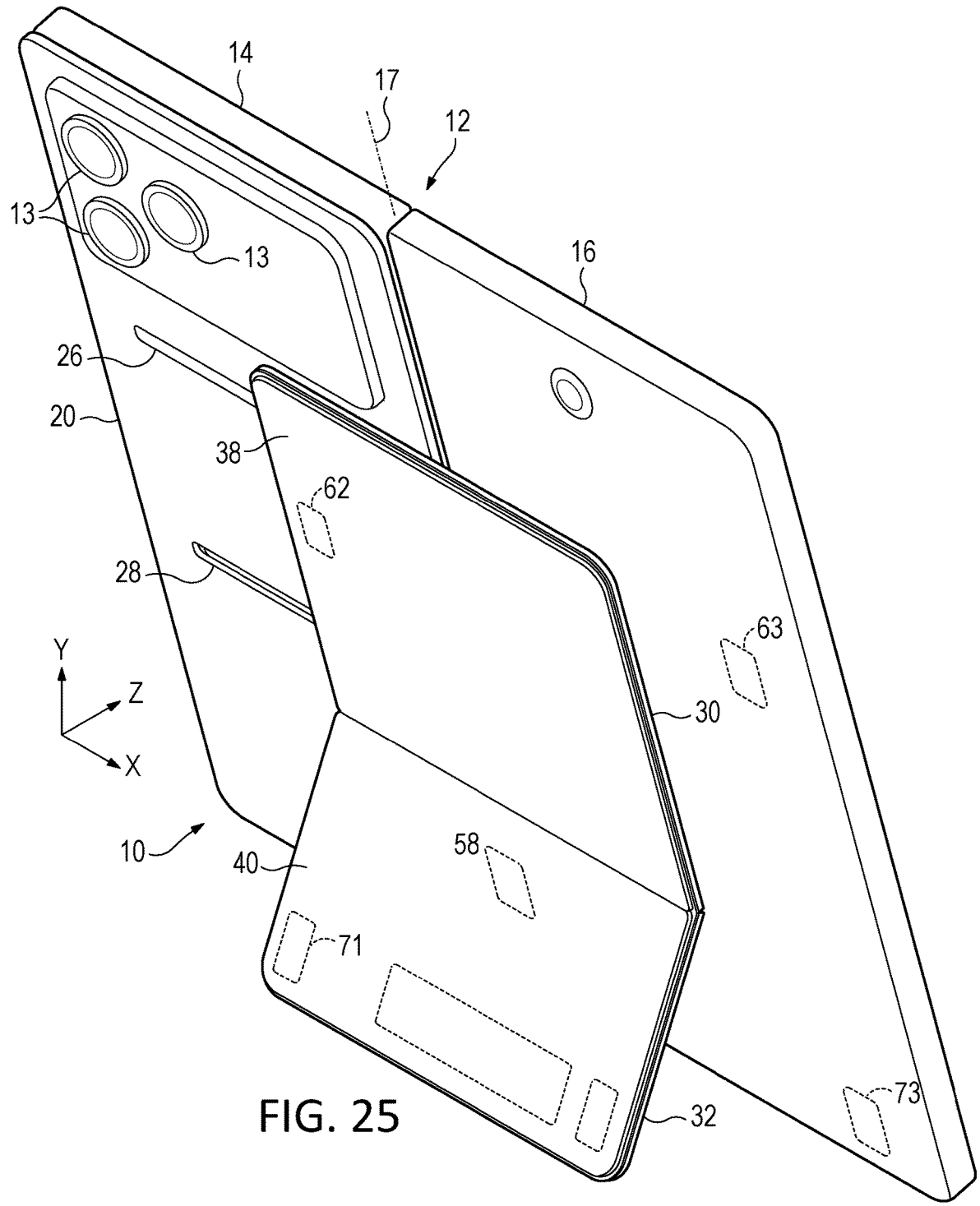
FIG. 25 shows the kickstand assembly of FIG. 24 in a deployed position.
Figure 26:
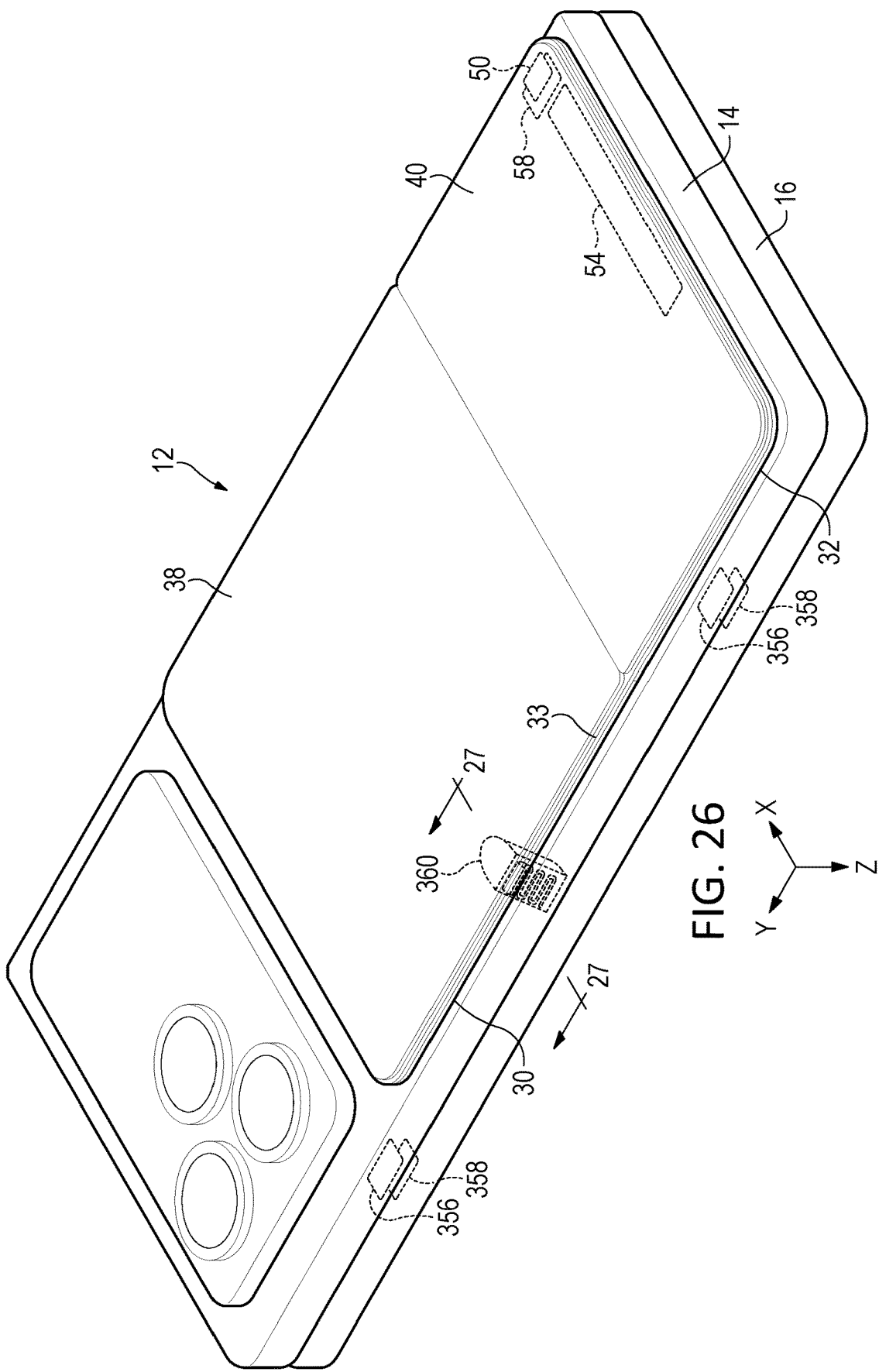
FIG. 26 shows another example of a kickstand assembly that comprises a slidable plunger to bias the first frame and the second frame to rotate open according to examples of the present disclosure.

In some examples, one or more additional magnets that bias the first frame and the second frame to rotate open from the closed orientation can be located in both the upper kickstand plate and the lower kickstand plate of the kickstand assembly. With reference now to FIGS. 24 and 25 and in the context of kickstand assembly 10, in some examples the upper kickstand plate 30 includes a device opening magnet 62 having a magnetic pole orientation that repels a frame opening magnet 63 in the second frame 16, and the lower kickstand plate 32 includes another device opening magnet 71 having a magnetic pole orientation that repels another frame opening magnet 73 in the second frame 16. As shown in FIG. 24, when the first frame 14 and second frame 16 are in the closed orientation, the device opening magnet 62 is laterally spaced from the frame opening magnet 63 in the x-axis direction such that it does not overlie the frame opening magnet 63, and the other device opening magnet 71 similarly is laterally spaced from the other frame opening magnet 73 in the x-axis direction such that it does not overlie the frame opening magnet 73.

As the kickstand assembly and upper kickstand plate 30 are translated in the x-axis direction, the device opening magnet 62 passes over and closer to the frame opening magnet 63 and the device opening magnet 71 passes over and closer to the frame opening magnet 73, thereby increasing the repelling force between these two pairs of magnets and correspondingly causing the first frame 14 and second frame 16 to rotate open from the closed orientation. FIG. 25 illustrates the foldable computing device 12 in the open orientation with the kickstand assembly 10 fully deployed. Accordingly, and in one potential advantage of this configuration, utilizing two pairs of repelling magnets can provide a stronger repelling force that releases and biases the first frame 14 and the second frame 16 from the closed orientation. While this example is described with respect to the kickstand assembly 10, it will be appreciated that two pairs of repelling magnets as described above can be utilized with kickstand assembly 200 and any other embodiments and features of kickstand assemblies.

In some examples of the configurations described herein, additional magnets are provided that function to hold the first frame 14 and second frame 16 in the open orientation and to retain the kickstand assembly in its fully translated position with respect to the two frames. With reference again to FIGS. 16 and 19, in this example the second frame 16 comprises a frame holding magnet 65 and the upper kickstand plate 30 comprises a plate holding magnet 67 that has a magnetic pole orientation that attracts the frame holding magnet. In this manner, after the first frame 14 and the second frame 16 are rotated to the open orientation, the frame holding magnet 65 is positioned to attract the plate holding magnet 67 and retain the second frame against the rear side 35 of the upper kickstand plate 30 to hold the first frame and the second frame in an open orientation.

As shown in FIGS. 16 and 17, when the first frame 14 and second frame 16 are in the closed orientation, the frame holding magnet 65 is laterally spaced from the plate holding magnet 67 in the x-axis direction such that it does not overlie the plate holding magnet. With reference also to FIG. 19, when the kickstand assembly and upper kickstand plate 30 are translated in the x-axis direction and the two frames are fully opened into the end-to-end open orientation, the frame holding magnet 65 is now at least partially overlying and attracting the plate holding magnet 67 to retain the second frame 16 against the rear side 35 of the upper kickstand plate 30. Accordingly, and in one potential advantage of this configuration, the frame holding magnet 65 and plate holding magnet 67 operate to both hold the first frame and the second frame in an open orientation and to retain the kickstand assembly in its fully translated position with respect to the two frames. As with the other features described herein, while this example is described with respect to the kickstand assembly 10, it will be appreciated that an upper kickstand plate that includes a plate holding magnet and a second frame that includes a frame holding magnet as described above can be utilized with kickstand assembly 200 and any other embodiments and features of kickstand assemblies.

In some examples of the configurations described herein, the kickstand assembly includes a biaser that biases the lower kickstand plate away from the backplate when the kickstand assembly is translated from its home position. In one example and with continued reference to FIGS. 16 and 19, the upper kickstand plate 30 is rotatably coupled to a lower kickstand plate 32 via a living hinge 31 that is pre-loaded to bias the lower kickstand plate away from the backplate. In this configuration, when the upper kickstand plate 30 is laterally translated in the positive x-axis direction relative to the backplate 20, and the backplate deploy magnet 58 repels the opening magnet 54 (see FIG. 8) to cause the lower kickstand plate 32 to rotate about the upper kickstand plate, the pre-loaded living hinge 31 operates to urge the lower kickstand plate to rotate to its fully deployed position as shown in FIG. 19.

In other examples, in addition to or in place of a living hinge, the kickstand assembly can include a biaser in the form of one or more springs, such as a leaf spring 69, extending between the upper kickstand plate 30 and the lower kickstand plate 32 and functioning to bias the lower kickstand plate away from the backplate. Advantageously, these configurations comprising a biaser that biases the lower kickstand plate away from the backplate ensure that the lower kickstand plate is fully deployed and remains deployed when the kickstand assembly is translated from its home position. As with the other features described herein, while this example is described with respect to the kickstand assembly 10, it will be appreciated a biaser that biases the lower kickstand plate away from the backplate as described above can be utilized with kickstand assembly 200 and any other embodiments and features of kickstand assemblies.

In some examples of the configurations described herein, when the upper kickstand plate is translated away from its home position, the upper kickstand plate engages and translates a plunger in the first frame that contacts the second frame and biases the first frame and the second frame to rotate open from a closed orientation. In one example and with reference to FIGS. 26-30, a plunger 360 is slidably received in a plunger aperture 364 defined in the first frame 14. The plunger 360 comprises a first ramped surface 366 at one end and an opposing contacting surface 368 at the opposite end.

Figure 27:
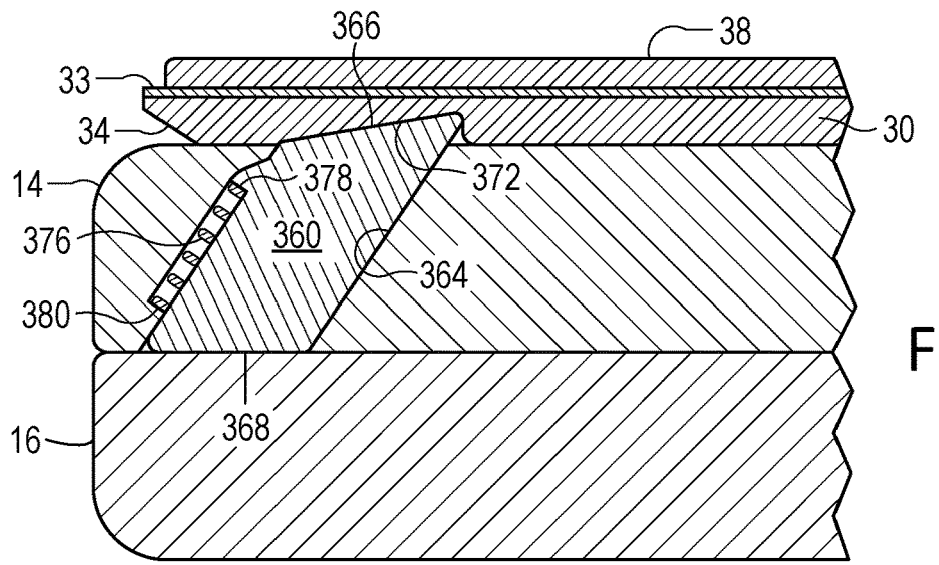
FIG. 27 is a cross-sectional view taken along line 27 in FIG. 26 showing.
Figure 28:
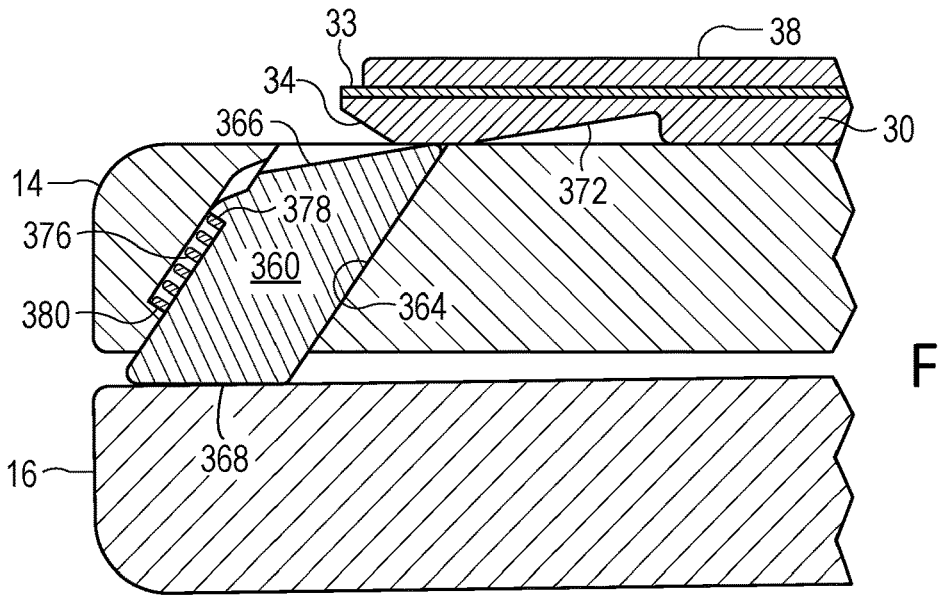
FIG. 28 shows the upper kickstand plate translated in the x-axis direction to translate the plunger into contact with the second frame.
Figure 29:
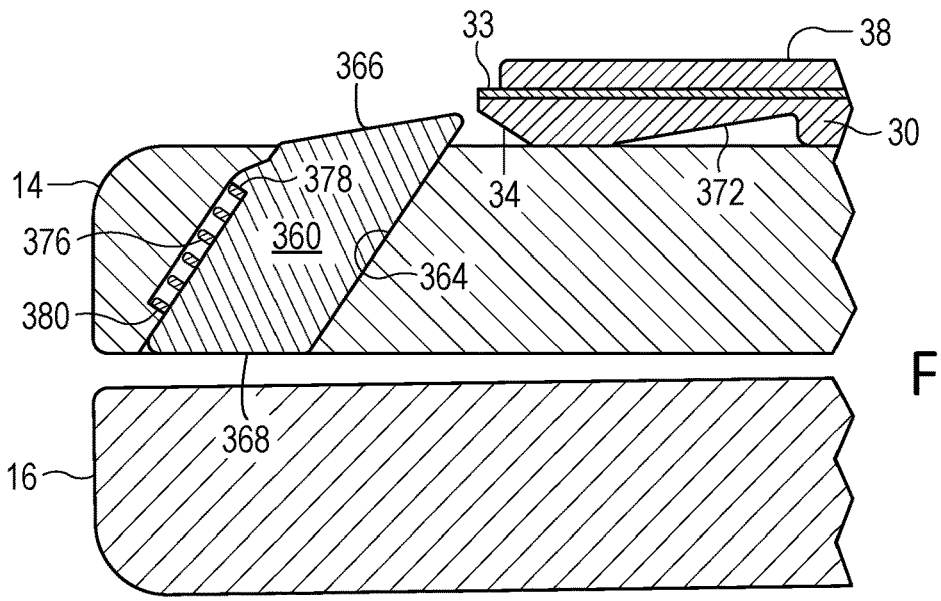
FIG. 29 shows the upper kickstand plate translated further in the x-axis direction and the plunger returned to a home position.
Figure 30:
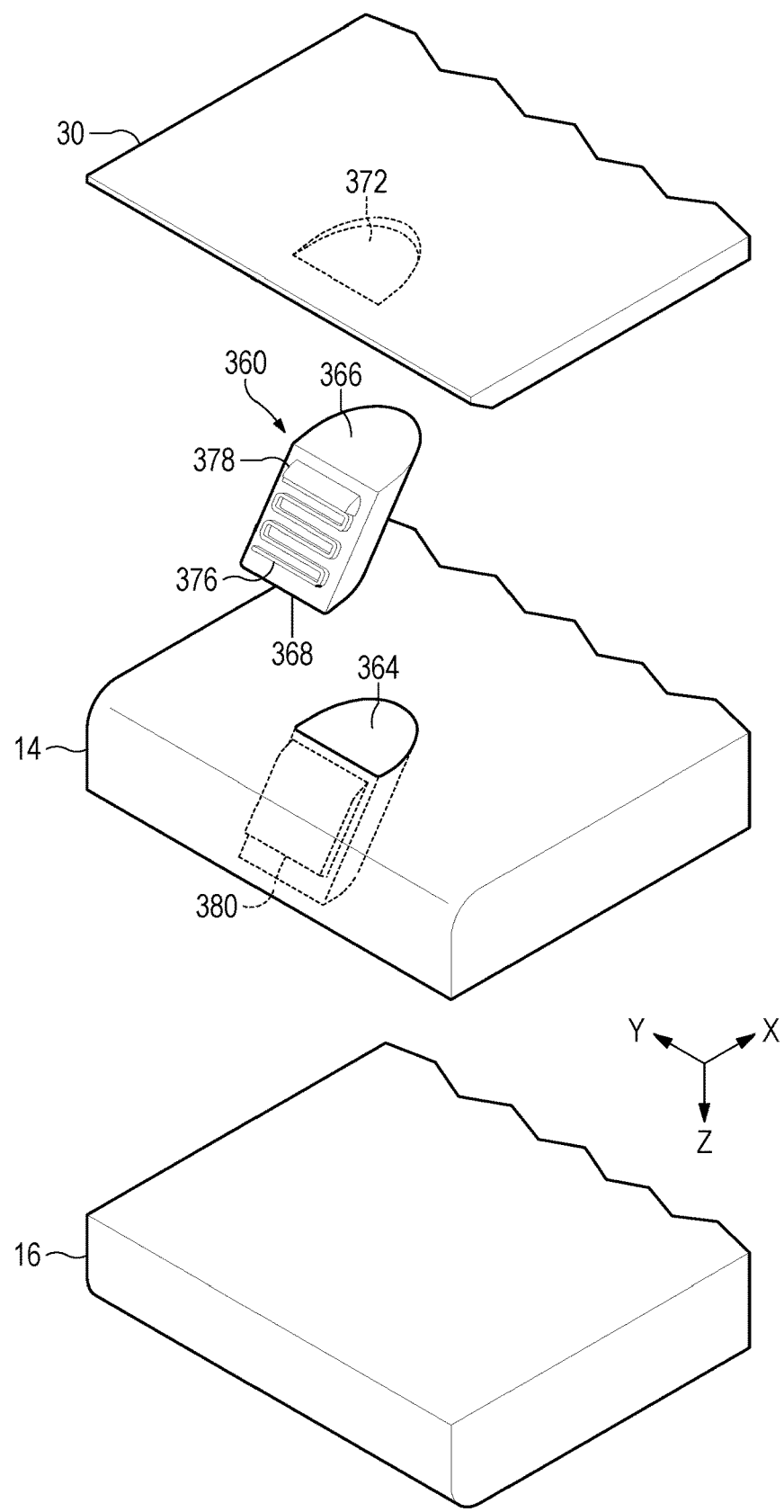
FIG. 30 shows a partial exploded view of the plunger, first frame, second frame, and upper kickstand plate.
Figure 31:
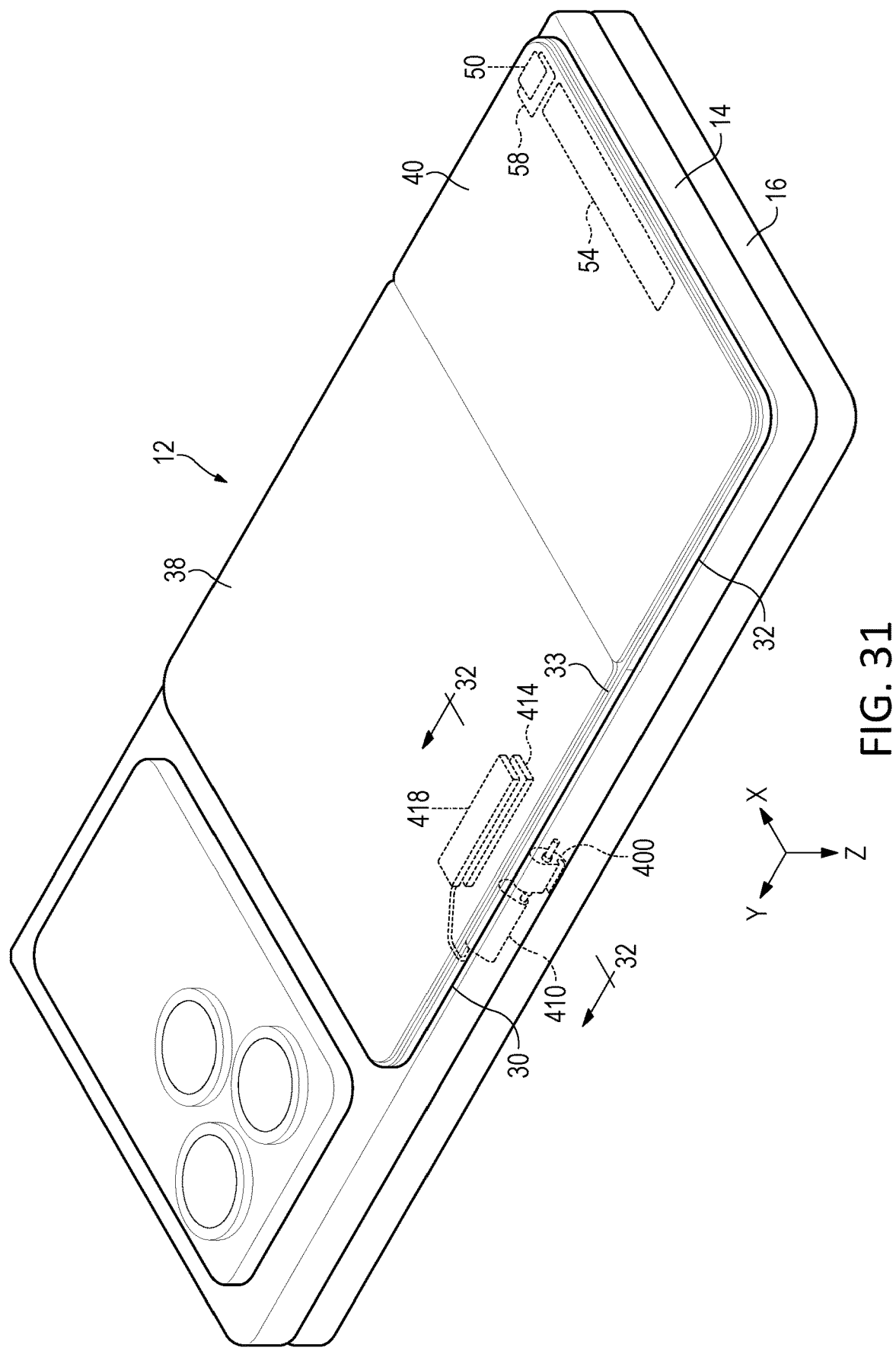
FIG. 31 shows another example of a kickstand assembly that comprises a moveable latch for releasing the first frame and the second frame to rotate open from a closed orientation according to examples of the present disclosure.

With reference to FIGS. 27-29, the upper kickstand plate 30 comprises a second ramped surface 372 recessed into the plate that contacts the first ramped surface 366 of the plunger 360 when the upper kickstand plate is in the home position of FIG. 27. As depicted in FIGS. 27 and 28, as the upper kickstand plate 30 is translated away from the home position, the second ramped surface 372 of the upper kickstand plate 30 slides along the first ramped surface 366 of the plunger 360 to translate the plunger 360 in the z-axis direction and into contact with the second frame 16. In this manner and as shown in FIG. 28, and in one potential advantage of this configuration, the contacting surface 368 of the plunger 360 positively biases the first frame 14 and the second frame 16 to rotate open from the closed orientation. Accordingly, and in one potential advantage of this configuration, moving the upper kickstand plate 30 away from the home position also causes the first frame 14 and the second frame 16 to rotate open from the closed orientation.

In some examples of this configuration and as noted above, the kickstand assembly also includes a biaser, such as the leaf spring 340 shown in FIGS. 14-15, that biases the first frame 14 and the second frame 16 to rotate from the closed orientation to the open orientation. In some examples that include a biaser and with reference again to FIG. 26, the foldable computing device 12 includes two first frame closing magnets 356 in the first frame 14 and two opposing second frame closing magnets 358 in the second frame 16. Each first frame closing magnet 356 attracts the corresponding second frame closing magnet 358 to retain the foldable computing device 12 in the closed orientation. When the plunger 360 is translated into contact with the second frame 16 as described above, the separating force of the plunger 360 is configured to overcome the attractive forces between the first frame closing magnets 356 and second frame closing magnets 358 to bias the first frame 14 and the second frame 16 to rotate open from the closed orientation.

In some examples, the kickstand assembly includes a plunger biaser within the plunger aperture that biases the plunger 360 toward the second ramped surface 372 of the upper kickstand plate 30. As shown in FIG. 27, in this example a plunger biaser in the form of spring 376 extends between a plunger ledge 378 and a base ledge 380 in the plunger aperture 364. The spring 376 biases the first ramped surface 366 of the plunger 360 into contact with the second ramped surface 372 in the upper kickstand plate 30. With reference to FIG. 29, after the upper kickstand plate 30 has translated past the plunger 360, the spring 376 returns the plunger to a home position. When the upper kickstand plate 30 is translated back to its home position of FIG. 27, a leading edge 34 of the upper kickstand plate 30 contacts and presses the plunger 360 downwardly to enable the upper kickstand plate 30 to continue translating and to seat the first ramped surface 366 against the second ramped surface 372 when the upper kickstand plate reaches its home position.

While this example is described with respect to the kickstand assembly 10, it will be appreciated that the plunger 360 and other components described above can be utilized with kickstand assembly 200 and any other embodiments and features and features of kickstand assemblies described herein.

Figure 35:
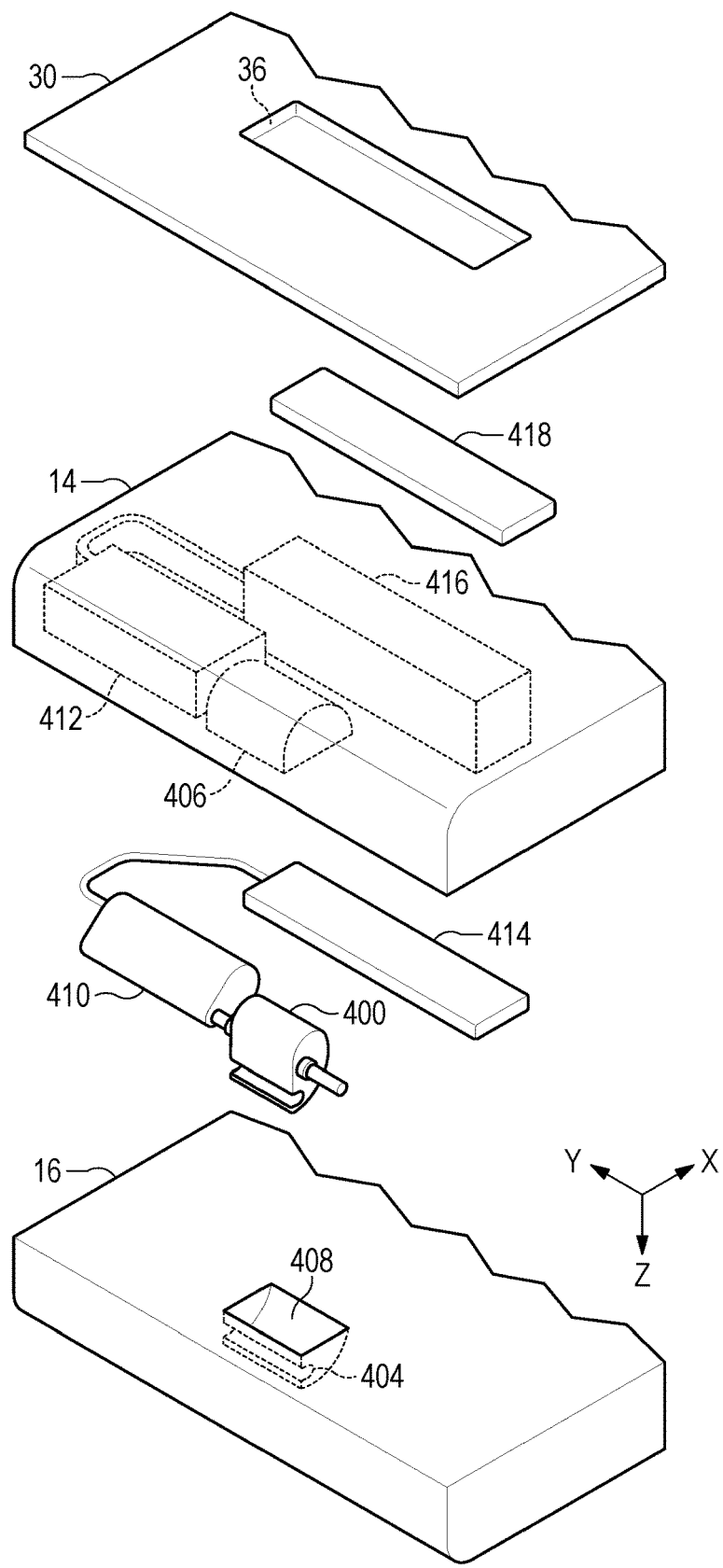
FIG. 35 shows a partial exploded view of the moveable latch, motor, sensor, first frame, second frame, trigger magnet, and upper kickstand plate.

In some examples of the configurations described herein, and as described further below, a moveable latch secures the first frame 14 to the second frame 16 in the closed orientation. When the upper kickstand plate is translated away from its home position, a motor is actuated to open the moveable latch and release the first frame and the second frame to rotate open from the closed orientation. In one example and with reference now to FIGS. 31-35, the first frame 14 comprises a rotatable latch 400 that is electrically coupled to a motor 410. A sensor in the first frame 14 is electrically connected to the motor 410. In this example, the sensor comprises a Hall effect switch 414. With reference to FIG. 35, the rotatable latch 400 is contained within a latch recess 406 defined in the first frame 14, the motor 410 is contained within a motor recess 412 defined in the first frame, and the Hall effect switch 414 is contained within a sensor recess 416 in the first frame.

As shown in FIG. 32, when the rotatable latch 400 is in a capturing position, the latch releasably captures a latching protrusion 404 located in a protrusion recess 408 that is defined in the second frame 16. The upper kickstand plate 30 includes a trigger magnet 418 located in a trigger magnet aperture 36 defined in the upper kickstand plate. When the upper kickstand plate 30 and kickstand assembly are in the home position of FIG. 32, the trigger magnet 418 overlies the Hall effect sensor 414.

As shown in FIG. 33, when the upper kickstand plate 30 is laterally translated relative to the first frame 14, the trigger magnet 418 is translated away from the Hall effect sensor 414 and triggers the sensor to cause the motor 412 to open the rotatable latch 400 and release the first frame 14 and the second frame 16 to rotate open from a closed orientation. Accordingly, and in one potential advantage of this configuration, moving the upper kickstand plate 30 away from the home position also releases rotatable latch 400 from retaining the first frame 14 and the second frame 16 in the closed orientation, thereby enabling them to rotate open from the closed orientation. In some examples and as noted above, the kickstand assembly also includes a biaser, such as the leaf spring 340 shown in FIGS. 14-15, that biases the first frame 14 and the second frame 16 to rotate from the closed orientation to the open orientation.

When the first frame 14 and second frame 16 are folded closed and the upper kickstand plate 30 is returned to its home position of FIG. 32, the trigger magnet 418 triggers the Hall effect sensor 414 to actuate the motor 410 to rotate the rotatable latch 400 and secure the first frame 14 and second frame 16 in the closed orientation.

In the present example, the rotatable latch 400 is also configured to positively bias open the first frame 14 and the second frame 16 from the closed orientation. With reference to FIG. 34, as the rotatable latch 400 continues rotating from its closed position of FIG. 32, a latch contacting surface 402 contacts the second frame 16 to bias the first frame 14 and the second frame to rotate open from the closed orientation. Advantageously in this example, the rotatable latch 400 also functions to positively bias the second frame 16 away from the first frame 14 when the upper kickstand plate 30 is translated away from the home position.

With reference now to FIG. 36, a flow diagram is provided depicting an example method 500 of using a kickstand assembly to release a first frame and a second frame of a foldable computing device from a closed orientation. The following description of method 500 is provided with reference to the different examples of kickstand assemblies, foldable computing devices, and related components described herein and shown in FIGS. 1-35. In other examples, the method 500 is performed in other contexts using other suitable components.

At 502, the method 500 includes sliding an upper kickstand plate of the kickstand assembly in a lateral direction relative to the first frame. At 504 the method 500 includes, at least on condition of sliding the upper kickstand plate in the lateral direction, biasing the first frame and the second frame to rotate open from the closed orientation. At 508 the method includes, wherein the first frame is rotatably coupled to the second frame at a frame hinge, and biasing the first frame and the second frame to rotate open from the closed orientation comprises biasing the first frame away from the second frame using a spring at the frame hinge. At 512 the method 500 includes, wherein biasing the first frame and the second frame to rotate open from the closed orientation comprises biasing the first frame away from the second frame using a device opening magnet in the kickstand assembly that repels a frame opening magnet in the second frame.

At 516 the method includes retaining the first frame and the second frame in an open orientation by attracting a plate holding magnet in the upper kickstand plate to a frame holding magnet in the second frame. At 520 the method 500 includes, wherein biasing the first frame and the second frame to rotate open from the closed orientation comprises translating a plunger slidably received in the first frame into contact with the second frame. At 524 the method 500 includes, wherein biasing the first frame and the second frame to rotate open from the closed orientation comprises triggering a sensor in the first frame to cause a motor in the first frame to open a moveable latch in the first frame and cause a latch contacting surface of the moveable latch to contact the second frame to bias the first frame and the second frame to rotate open from the closed orientation.

The following paragraphs provide additional support for the claims of the subject application. One aspect provides a kickstand assembly for a foldable computing device comprising a first frame rotatably coupled to a second frame, the second frame comprising a frame opening magnet, the kickstand assembly comprising: a backplate comprising a backplate deploy magnet; an upper kickstand plate slidably connected to the backplate; a lower kickstand plate rotatably coupled to the upper kickstand plate and comprising: a closing magnet that attracts the backplate deploy magnet; and a kickstand opening magnet laterally spaced from the closing magnet, the kickstand opening magnet repelling the backplate deploy magnet to cause the lower kickstand plate to rotate about the upper kickstand plate when the upper kickstand plate is laterally translated relative to the backplate; and a device opening magnet that repels the frame opening magnet in the second frame to bias the first frame and the second frame to rotate open from a closed orientation when the upper kickstand plate is laterally translated relative to the backplate. The apparatus may additionally or alternatively include, wherein the device opening magnet is in the upper kickstand plate. The apparatus may additionally or alternatively include, wherein the device opening magnet is in the lower kickstand plate. The apparatus may additionally or alternatively include, wherein the frame opening magnet is a first frame opening magnet, the second frame comprises a second frame opening magnet, the device opening magnet is a first device opening magnet in the upper kickstand plate, and the lower kickstand plate comprises a second device opening magnet that repels the second frame opening magnet in the second frame to bias the first frame and the second frame to rotate open from the closed orientation when the upper kickstand plate is laterally translated relative to the backplate. The apparatus may additionally or alternatively include, wherein the second frame comprises a frame holding magnet and the upper kickstand plate comprises a plate holding magnet, wherein the plate holding magnet attracts the frame holding magnet to retain the first frame and the second frame in an open orientation. The apparatus may additionally or alternatively include, wherein the lower kickstand plate is rotatably coupled to the upper kickstand plate at a kickstand hinge that comprises a biaser that biases the lower kickstand plate away from the backplate.

Another aspect provides a kickstand assembly for a foldable computing device comprising a first frame rotatably coupled to a second frame, the second frame comprising a frame holding magnet, the kickstand assembly comprising: a backplate comprising a backplate deploy magnet; an upper kickstand plate slidably connected to the backplate, the upper kickstand plate comprising a plate holding magnet; a lower kickstand plate rotatably coupled to the upper kickstand plate and comprising: a closing magnet that attracts the backplate deploy magnet; and a kickstand opening magnet laterally spaced from the closing magnet, the kickstand opening magnet repelling the backplate deploy magnet to cause the lower kickstand plate to rotate about the upper kickstand plate when the upper kickstand plate is laterally translated relative to the backplate; wherein the plate holding magnet attracts the frame holding magnet to retain the first frame and the second frame in an open orientation. The kickstand assembly may additionally or alternatively include, wherein the second frame comprises a frame opening magnet, and the kickstand assembly further comprising a device opening magnet that repels the frame opening magnet in the second frame to bias the first frame and the second frame to rotate open from a closed orientation when the upper kickstand plate is laterally translated relative to the backplate. The kickstand assembly may additionally or alternatively include, wherein the frame opening magnet is a first frame opening magnet, the second frame comprises a second frame opening magnet, the device opening magnet is a first device opening magnet in the upper kickstand plate, and the lower kickstand plate comprises a second device opening magnet that repels the second frame opening magnet in the second frame to bias the first frame and the second frame to rotate open from the closed orientation when the upper kickstand plate is laterally translated relative to the backplate. The kickstand assembly may additionally or alternatively include, wherein the lower kickstand plate is rotatably coupled to the upper kickstand plate at a kickstand hinge that comprises a biaser that biases the lower kickstand plate away from the backplate.

Another aspect provides a kickstand assembly for a foldable computing device comprising a first frame rotatably coupled to a second frame, the first frame comprising a backplate deploy magnet, the first frame defining a plunger aperture that slidably receives a plunger, the plunger comprising a first ramped surface and an opposing contacting surface, the kickstand assembly comprising: an upper kickstand plate slidably connected to the first frame and comprising a second ramped surface that contacts the first ramped surface of the plunger when the upper kickstand plate is in a home position; and a lower kickstand plate rotatably coupled to the upper kickstand plate and comprising: a closing magnet that attracts the backplate deploy magnet; and a kickstand opening magnet laterally spaced from the closing magnet, the kickstand opening magnet repelling the backplate deploy magnet to cause the lower kickstand plate to rotate about the upper kickstand plate when the upper kickstand plate is laterally translated relative to the backplate; wherein when the upper kickstand plate is laterally translated from the home position, the second ramped surface of the upper kickstand plate slides along the first ramped surface of the plunger to translate the plunger into contact with the second frame and bias the first frame and the second frame to rotate open from a closed orientation. The kickstand assembly may additionally or alternatively include a plunger biaser within the plunger aperture that biases the plunger toward the second ramped surface of the upper kickstand plate. The kickstand assembly may additionally or alternatively include, wherein the second frame comprises a frame holding magnet and the upper kickstand plate comprises a plate holding magnet, wherein the plate holding magnet attracts the frame holding magnet to retain the first frame and the second frame in an open orientation. The kickstand assembly may additionally or alternatively include, wherein the lower kickstand plate is rotatably coupled to the upper kickstand plate at a kickstand hinge that comprises a biaser biases the lower kickstand plate away from the backplate.

Another aspect provides a kickstand assembly for a foldable computing device comprising a first frame rotatably coupled to a second frame, the first frame comprising a moveable latch coupled to a motor, a sensor electrically connected to the motor, and a backplate deploy magnet, the second frame comprising a latching protrusion releasably captured by the moveable latch, the kickstand assembly comprising: an upper kickstand plate slidably connected to the first frame and comprising a trigger magnet; and a lower kickstand plate rotatably coupled to the upper kickstand plate and comprising: a closing magnet that attracts the backplate deploy magnet; and a kickstand opening magnet laterally spaced from the closing magnet, the kickstand opening magnet repelling the backplate deploy magnet to cause the lower kickstand plate to rotate about the upper kickstand plate when the upper kickstand plate is laterally translated relative to the backplate; wherein when the upper kickstand plate is laterally translated relative to the first frame, the trigger magnet triggers the sensor to cause the motor to open the moveable latch and release the first frame and the second frame to rotate open from a closed orientation. The kickstand assembly may additionally or alternatively include, wherein a latch contacting surface of the moveable latch contacts the second frame to bias the first frame and the second frame to rotate open from the closed orientation. The kickstand assembly may additionally or alternatively include, wherein the second frame comprises a frame opening magnet, the kickstand assembly further comprising a device opening magnet that repels the frame opening magnet in the second frame to bias the first frame and the second frame to rotate open from a closed orientation when the upper kickstand plate is laterally translated relative to the backplate. The kickstand assembly may additionally or alternatively include, wherein the second frame comprises a frame holding magnet and the upper kickstand plate comprises a plate holding magnet, wherein the plate holding magnet attracts the frame holding magnet to retain the first frame and the second frame in an open orientation. The kickstand assembly may additionally or alternatively include, wherein the lower kickstand plate is rotatably coupled to the upper kickstand plate at a kickstand hinge that comprises a biaser that biases the lower kickstand plate away from the backplate. The kickstand assembly may additionally or alternatively include, wherein the first frame defines a plunger aperture that slidably receives a plunger, the plunger comprising a first ramped surface and an opposing contacting surface, and the upper kickstand plate comprises a second ramped surface that contacts the first ramped surface of the plunger when the upper kickstand plate is in a home position, wherein when the upper kickstand plate is laterally translated from the home position, the second ramped surface of the upper kickstand plate slides along the first ramped surface of the plunger to translate the plunger into contact with the second frame and bias the first frame and the second frame to rotate open from a closed orientation.

Another aspect provides, in a foldable computing device comprising a first frame rotatably coupled to a second frame, a method of using a kickstand assembly to release the first frame and the second frame from a closed orientation, the method comprising: sliding an upper kickstand plate of the kickstand assembly in a lateral direction relative to the first frame; and at least on condition of sliding the upper kickstand plate in the lateral direction, biasing the first frame and the second frame to rotate open from the closed orientation. The method may additionally or alternatively include, wherein the first frame is rotatably coupled to the second frame at a frame hinge, and biasing the first frame and the second frame to rotate open from the closed orientation comprises biasing the first frame away from the second frame using a spring at the frame hinge. The method may additionally or alternatively include, wherein biasing the first frame and the second frame to rotate open from the closed orientation comprises biasing the first frame away from the second frame using a device opening magnet in the kickstand assembly that repels a frame opening magnet in the second frame. The method may additionally or alternatively include retaining the first frame and the second frame in an open orientation by attracting a plate holding magnet in the upper kickstand plate to a frame holding magnet in the second frame. The method may additionally or alternatively include, wherein biasing the first frame and the second frame to rotate open from the closed orientation comprises translating a plunger slidably received in the first frame into contact with the second frame. The method may additionally or alternatively include, wherein biasing the first frame and the second frame to rotate open from the closed orientation comprises triggering a sensor in the first frame to cause a motor in the first frame to open a moveable latch in the first frame and cause a latch contacting surface of the moveable latch to contact the second frame to bias the first frame and the second frame to rotate open from the closed orientation.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A kickstand assembly for a foldable computing device comprising a first frame rotatably coupled to a second frame, the second frame comprising a frame opening magnet, the kickstand assembly comprising:
    a backplate comprising a backplate deploy magnet;
    an upper kickstand plate slidably connected to the backplate;
    a lower kickstand plate rotatably coupled to the upper kickstand plate and comprising:
        a closing magnet that attracts the backplate deploy magnet; and
        a kickstand opening magnet laterally spaced from the closing magnet, the kickstand opening magnet repelling the backplate deploy magnet to cause the lower kickstand plate to rotate about the upper kickstand plate when the upper kickstand plate is laterally translated relative to the backplate; and
    a device opening magnet that repels the frame opening magnet in the second frame to bias the first frame and the second frame to rotate open from a closed orientation when the upper kickstand plate is laterally translated relative to the backplate.

2. The kickstand assembly of claim 1, wherein the device opening magnet is in the upper kickstand plate.

3. The kickstand assembly of claim 1, wherein the device opening magnet is in the lower kickstand plate.

4. The kickstand assembly of claim 1, wherein the frame opening magnet is a first frame opening magnet, the second frame comprises a second frame opening magnet, the device opening magnet is a first device opening magnet in the upper kickstand plate, and the lower kickstand plate comprises a second device opening magnet that repels the second frame opening magnet in the second frame to bias the first frame and the second frame to rotate open from the closed orientation when the upper kickstand plate is laterally translated relative to the backplate.

5. The kickstand assembly of claim 1, wherein the second frame comprises a frame holding magnet and the upper kickstand plate comprises a plate holding magnet, wherein the plate holding magnet attracts the frame holding magnet to retain the first frame and the second frame in an open orientation.

6. The kickstand assembly of claim 1, wherein the lower kickstand plate is rotatably coupled to the upper kickstand plate at a kickstand hinge that comprises a biaser that biases the lower kickstand plate away from the backplate.

7. A kickstand assembly for a foldable computing device comprising a first frame rotatably coupled to a second frame, the second frame comprising a frame holding magnet, the kickstand assembly comprising:
    a backplate comprising a backplate deploy magnet;
    an upper kickstand plate slidably connected to the backplate, the upper kickstand plate comprising a plate holding magnet;
    a lower kickstand plate rotatably coupled to the upper kickstand plate and comprising:
        a closing magnet that attracts the backplate deploy magnet; and
        a kickstand opening magnet laterally spaced from the closing magnet, the kickstand opening magnet repelling the backplate deploy magnet to cause the lower kickstand plate to rotate about the upper kickstand plate when the upper kickstand plate is laterally translated relative to the backplate;
    wherein the plate holding magnet attracts the frame holding magnet to retain the first frame and the second frame in an open orientation.

8. The kickstand assembly of claim 7, wherein the second frame comprises a frame opening magnet, and the kickstand assembly further comprising a device opening magnet that repels the frame opening magnet in the second frame to bias the first frame and the second frame to rotate open from a closed orientation when the upper kickstand plate is laterally translated relative to the backplate.

9. The kickstand assembly of claim 8, wherein the frame opening magnet is a first frame opening magnet, the second frame comprises a second frame opening magnet FIG. 24, the device opening magnet is a first device opening magnet in the upper kickstand plate, and the lower kickstand plate comprises a second device opening magnet that repels the second frame opening magnet in the second frame to bias the first frame and the second frame to rotate open from the closed orientation when the upper kickstand plate is laterally translated relative to the backplate.

10. The kickstand assembly of claim 7, wherein the lower kickstand plate is rotatably coupled to the upper kickstand plate at a kickstand hinge that comprises a biaser that biases the lower kickstand plate away from the backplate.

* * * * *